(12) United States Patent
Gunckel et al.

(10) Patent No.: US 11,932,739 B2
(45) Date of Patent: Mar. 19, 2024

(54) STRESS-RESPONSIVE COMPOSITES

(71) Applicant: ARIZONA BOARD OF REGENTS ON BEHALF OF ARIZONA STATE UNIVERSITY, Scottsdale, AZ (US)

(72) Inventors: Ryan Gunckel, Tempe, AZ (US); Lenore Dai, Phoenix, AZ (US); Aditi Chattopadhyay, Chandler, AZ (US); Bonsung Koo, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 161 days.

(21) Appl. No.: 17/527,905

(22) Filed: Nov. 16, 2021

(65) Prior Publication Data
US 2022/0243017 A1  Aug. 4, 2022

Related U.S. Application Data

(63) Continuation of application No. 16/390,969, filed on Apr. 22, 2019, now Pat. No. 11,174,359.

(60) Provisional application No. 62/660,796, filed on Apr. 20, 2018.

(51) Int. Cl.
*C08J 5/08* (2006.01)
*C08J 3/28* (2006.01)
*C08J 5/04* (2006.01)
*G01J 1/42* (2006.01)
*G01L 1/24* (2006.01)

(52) U.S. Cl.
CPC . *C08J 5/08* (2013.01); *C08J 3/28* (2013.01); *C08J 5/042* (2013.01); *G01J 1/429* (2013.01); *G01L 1/24* (2013.01); *C08J 2363/00* (2013.01)

(58) Field of Classification Search
CPC ......... C08J 3/28; C08J 3/42; C08J 5/08; C08J 2363/00; G01J 1/429; G01L 1/24
USPC .......................................... 524/494
See application file for complete search history.

(56) References Cited

U.S. PATENT DOCUMENTS

| | | |
|---|---|---|
| 4,100,222 A | 7/1978 | Iwamoto et al. |
| 2014/0013864 A1* | 1/2014 | Hickenboth ......... C09D 175/04 977/773 |

* cited by examiner

*Primary Examiner* — Edward J Cain
(74) *Attorney, Agent, or Firm* — Michael Best & Friedrich LLP

(57) ABSTRACT

Composite material can include a matrix material, a fiber dispersed in the matrix material, and an ultraviolet (UV)-light sensitive mechanophore grafted to a surface of the fiber. A method for making a fiber-reinforced polymer composite can include contacting a fiber in a first solution, rinsing and then drying intermediate fiber, contacting dried fiber in a third solution, rinsing, and then drying the rinsed fiber thereby generating functionalized fiber that is sensitive to ultraviolet light. The functionalized fiber can be combined with a polymer matrix material, cured, and irradiated, thereby generating a fiber-reinforced polymer composite.

11 Claims, 26 Drawing Sheets

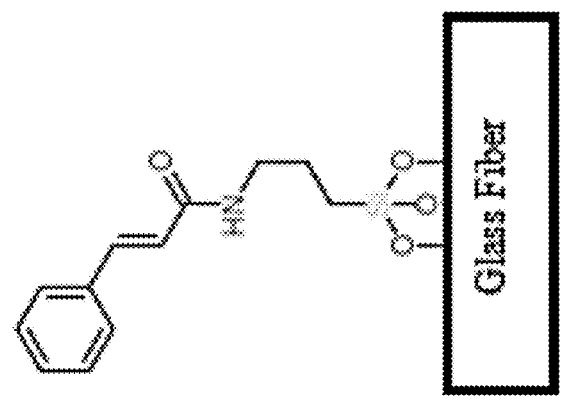
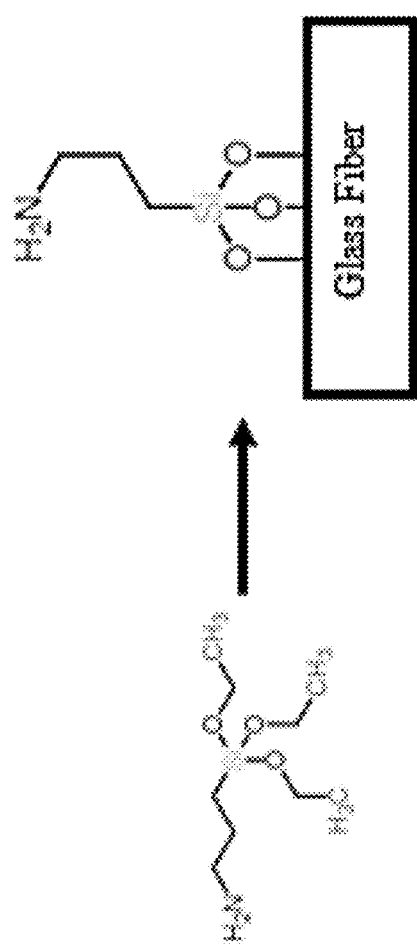
FIG. 2C
FIG. 2B
FIG. 2A

Induced delamination — 3-Ply GFRP

Healthy specimen | Specimen with Teflon

FIG. 5A 'Neat' Glass Fibers

FIG. 5B Grafted Cinnamoyl Fibers

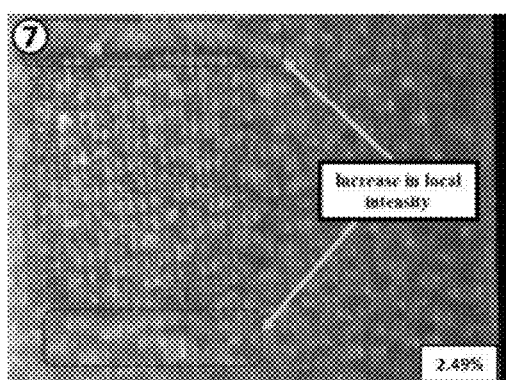 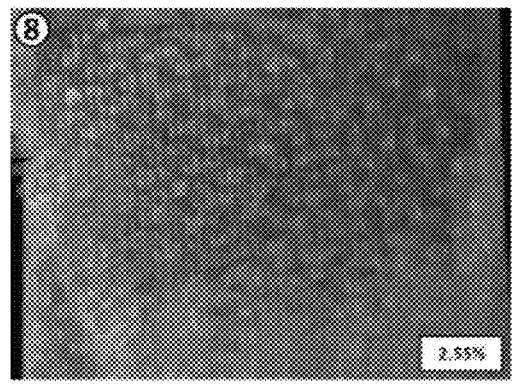
*FIG. 18G*  *FIG. 18H*

STRESS-RESPONSIVE COMPOSITES

CROSS-REFERENCE

The present application claims priority to U.S. provisional patent application No. 62/660,796, filed on Apr. 20, 2018, the disclosure of which is hereby incorporated by reference in its entirety.

STATEMENT REGARDING FEDERALLY SPONSORED RESEARCH

Aspects of this disclosure were made with government support under grant number W911NF-17-P-0064, awarded by the U.S. Department of Defense. The government has certain rights in the disclosure.

INTRODUCTION

Conventional force responsive molecular units used in composites involve particulate probes embedded into a matrix or thermoplastic, or chemically bonding into a matrix or thermoplastic directly. These methods have been shown to observe damage occurring to the matrix itself, but not any damage occurring to the inorganic fiber or other materials incorporated into the composite.

SUMMARY

In one aspect, disclosed herein are stress-responsive inorganic material (such as glass fibers, carbon blacks, carbon nanotubes, etc.) reinforced composites, which are developed via functionalization of the inorganic materials with mechanphore functional groups. Because of the force-responsive moieties at the surface of the inorganic material-matrix interface, the disclosed systems can be capable of detecting delamination occurring within the composites.

In another aspect, disclosed herein is the functionalization of glass fibers, for example. Similar methods may be modified and applied to other inorganic reinforcement materials.

In yet another aspect, disclosed herein is a stress responsive inorganic material reinforced composite capable of detecting delamination effects. The inorganic materials are functionalized at the surface with a fluorescent force-responsive moiety.

In yet another aspect, a novel self-sensing glass fiber is synthesized by grafting cinnamoyl group directly onto the surface of the glass fiber (also called functionalized glass fiber).

In yet another aspect, an improved sensitivity of mechanophore activation in the functionalized glass fiber under quasi-static loading is exhibited.

In yet another aspect, the mechanical and thermal property effects of grafting mechanophore onto glass fiber surface is characterized.

In yet another aspect, morphology of the functionalized glass fiber reinforced polymer (GFRP) composite specimens with an induced delamination is analyzed.

In yet another aspect, early damage detection capability in GFRP specimens under quasi-static loading condition is demonstrated. An approximately linear trend between intensity and strain was observed in conjunction with a sharp increase in intensity due to microcrack formation in the matrix prior to yield.

In yet another aspect, fatigue damage detection in GFRP specimens is demonstrated; optical images show an increase in intensity with increase in fatigue cycle.

In yet another aspect, the use of Di-AC for early damage detection in carbon fiber reinforced polymer (CFRP) composite specimens under quasi-static loading is demonstrated.

In yet another aspect, interlaminar damage detection capability in GFRP/CFRP composite samples under quasi-static loading is investigated; concentrated activation of mechanophores was observed around the interlaminar damage.

Other aspects of the disclosure will become apparent by consideration of the detailed description and accompanying drawings. There is no specific requirement that a material, technique or method include all of the details characterized herein, in order to obtain some benefit according to the present disclosure. Thus, the specific examples characterized are meant to be exemplary applications of the techniques described, and alternatives are possible.

BRIEF DESCRIPTION OF THE DRAWINGS

FIG. 2 shows a two-step process for functionalization, i.e., covalently grafting mechanophores to the surface of a glass fiber.

FIG. 5A-FIG. 5C show fluorescent images for (a) fibers with no coating and (b) functionalized fibers with mechanophore. Unaltered images were processed in ImageJ to produce integrated density information (c).

FIG. 18A-FIG. 18H show UV images of a Di-AC embedded three-ply GFRP composite specimen with delamination.

DETAILED DESCRIPTION

Materials and methods disclosed and contemplated herein are directed to observing damage response with respect to inorganic material-matrix interfaces. Certain materials and methods disclosed and contemplated herein are particularly suited for observing delamination with respect to inorganic material-matrix interfaces. Systems disclosed and contemplated herein can also provide a capability of detecting damage along the surface of an inorganic material in composites via a chemical probe. In some implementations, a load frame modified with a UV lamp and UV camera can be used to observe damage real-time. In contrast, most techniques currently used to examine delamination, such as x-ray, analyze delamination occurring after the damage has already happened and require much more complex equipment to analyze the signal.

I. Example Composite Materials

Example composite materials disclosed and contemplated herein include matrix material, one or more fibers dispersed in the matrix material, and an ultraviolet (UV)-light sensitive mechanophore grafted to a surface of the fiber.

Figure 1:
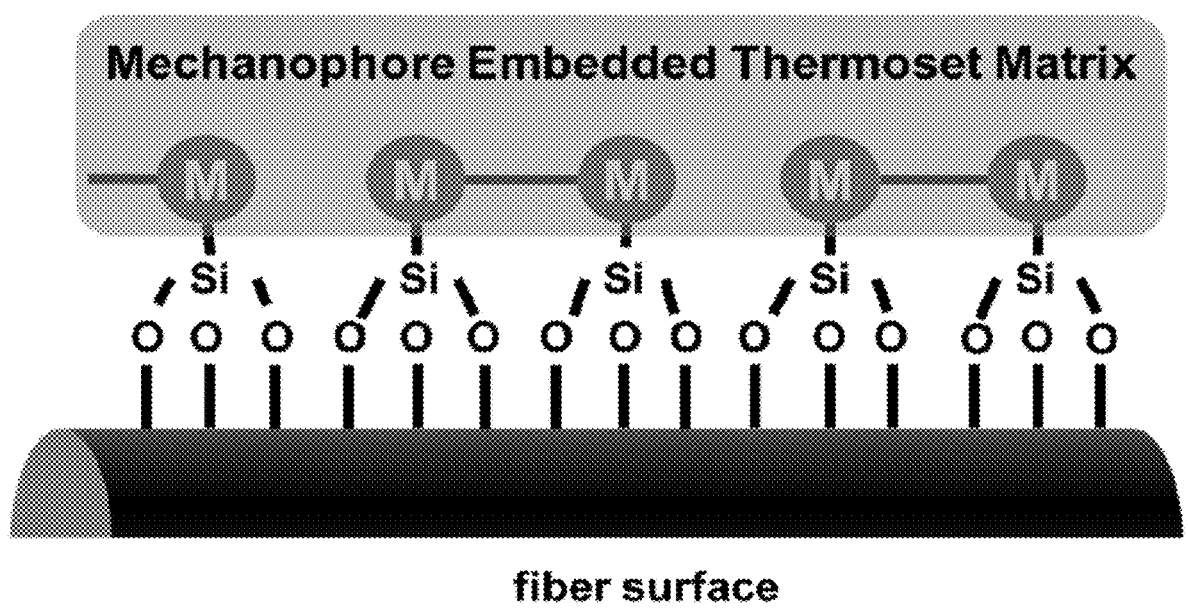
FIG. 1 shows a schematic of a mechanophore embedded thermoset matrix on a glass fiber surface.

FIG. 1 shows a schematic illustration of an example composite material. The example composite material includes a mechanophore-embedded thermoset matrix on a fiber surface. UV-light sensitive mechanophores are indicated, schematically, as M. Example fibers can include glass fibers and carbon fibers. After functionalization treatment, the fibers show an increase in fluorescence. Functionalization of fibers can also potentially resist delamination. Mechanophores dimerize at the surface of fibers; delamination or stress concentration at the fiber surface causes activation.

In some instances, example matrix material includes a thermoset polymer. In some instances, example matrix material includes an epoxy resin and a hardener. Example fibers that can be used in exemplary composite materials include glass fibers and carbon fibers.

Example UV-light sensitive mechanophores with self-sensing capability were developed and demonstrate effectiveness of the stress-sensitive polymeric system in detecting early damage in fiber reinforced polymer composites, such as glass fiber reinforced polymer (GFRP) composites and carbon fiber reinforced polymer (CFRP) composites. In some instances, UV-light sensitive mechanophores include a silane group. In some instances, UV-light sensitive mechanophores are derived from a reaction including 3-aminopropyl triethoxysilane. In some instances, UV-light sensitive mechanophores include dimeric anthracene (Di-AC). In some instances, UV-light sensitive mechanophores are capable of a fluorescent response when the composite material has interlaminar damage. Typically, UV-light sensitive mechanophores are directly grafted to the surface of the fiber through attachment of a pendant amine group to the surface of the fiber. Typically, UV-light sensitive mechanophores are not embedded in the matrix material.

FIGS. 2A-2C show an exemplary two-step process for functionalization. The exemplary process includes covalently grafting mechanophores to the surface of a glass fiber. The process includes creation of pendant amine groups via (3-aminopropyl)triethoxysilane (APTES) and reaction of pendant amine groups with cinnamoyl chloride.

Different types of mechanophores have been reported for capturing molecular-scale damage in thermoplastic and thermoset polymers. Among these mechanophores, spiropyran-based mechanophore has received significant attention due to its visibility to the naked eye upon the initiation of molecular-scale damage under mechanical loading. The external force transforms the colorless spiropyran into the colored merocyanine (red). However, the ability of spiropyran-based mechanophore for early damage detection is limited because it requires large strain for activation. Color change is only observed after yield during tensile loading test of spiropyran embedded polymers. This is due to the unique activation mechanism of spiropyran: the spiropyran can be activated when only a specific C—O bond breaks. Therefore, in order to effectively transfer external macroscopic force to this spiropyran, polymer chains (thermoplastic) which the spiropyran can be linked to are necessary. Consequently, this necessitates a large strain for the spiropyran activation; the slack and entangled thermoplastic polymer chain must be stretched first before the external force transfer to the spiropyran when the external tensile loading is applied. Additionally, it is noteworthy that host materials for the spiropyran was thermoplastic which has a relatively low melting point and low stiffness compared to thermoset. Given that many desirable applications are associated with extreme conditions such as high temperature and high loading, mechanophores which can be mixed/synthesized with thermoset is very desirable. In the current state of the art, in situ damage detection in composites is challenging.

Previously, incorporation of cyclobutane-based mechanophores embedded as particles in a GFRP composite specimen was investigated by the inventors. It was later proposed that rather than embedding sensors into the matrix, it would be beneficial to directly graft the cyclobutane chemical sensor directly onto the surface of the fiber to concentrate the type of signal observed. Therefore, any signal detected by the chemical sensor would be directly proportional to the force applied at the fiber-matrix interface, and any early indicators of delamination would be observable as fluorescent response.

To accomplish this, as disclosed herein, the cinnamoyl group can be attached by an acid chloride to an amine group of a pendant amine group via a readily-occurring surface reaction. These pendant amine groups can be attached to the surface of a glass fiber via traditional coating methods using (3-aminopropyl)triethoxysilane (APTES), for example.

Dimeric anthracene (Di-AC)-based mechanophore was synthesized. Di-AC-based mechanophore not only can be mixed with thermoset polymers but also has superior force sensitivity and fluorescence intensity on activation. The activated Di-ACs emits ultraviolet (UV) fluorescence, and the color change can be observed using fluorescence microscopy. Displacement-controlled compression tests on a set of polymer coupons ($3 \times 4 \times 8$ mm$^3$ cubic), conducted at different strain rates, showed increase in intensity prior to yield; these results exhibit the ability of using Di-ACs for early damage detection in thermoset polymers.

II. Example Methods

Example methods for making fiber-reinforced polymer composites can include various operations. In an example embodiment, a method includes first contacting a fiber in a first solution. As a result, an intermediate fiber is generated that includes a monolayer on at least a portion of an outer surface of the fiber. In some instances, the first solution includes 3-aminopropyl triethoxysilane (APTES). The first solution can also include toluene.

Next, the intermediate fiber is rinsed in a second solution, after which the rinsed intermediate fiber is dried. In some instances, the second solution can include ethanol. Then the dried intermediate fiber is contacted in a third solution, thereby generating a second intermediate fiber. The third solution can include acetonitrile and cinnamoyl chloride.

Next, the second intermediate fiber is rinsed in a fourth solution. In some instances, the fourth solution can include ethanol. Then the rinsed second intermediate fiber is dried, generating a functionalized fiber that is sensitive to ultraviolet light. Next, the functionalized fiber is combined with a polymer matrix material and cured, generating a cured composite material. Then, the cured composite material is irradiated with a light source, generating the fiber-reinforced composite. In some instances, the light source is configured to emit ultraviolet light.

The example method can be repeated to combine two or more layers of fiber-reinforced polymer composite.

In an example implementation, fibers were prepared by first cleaning glass fibers with a piranha solution to ensure no contaminants or coatings were present on the surface of the glass fiber. Next, a 10 mM solution of APTES in toluene was prepared, and the cleaned glass fibers were submerged for 4 hours at room temperature. After coating with APTES, fibers were removed, washed with toluene and ethanol, and allowed to dry under a nitrogen stream. Next, a mixture of 200 mg cinnamoyl chloride, 1 mL trimethylamine, and 200 mL acetonitrile was prepared. The APTES coated fibers were submerged in this mixture for at least 24 hours, washed with acetonitrile and ethanol, and allowed to dry under a nitrogen stream. To prepare the composite, epoxy resin FS-A23 and hardener FS-B412 were mixed at a ratio of 100:27, respectively. Before curing, the epoxy was spread over the surface of the functionalized glass fibers. When spreading, pressure was applied by hand to ensure there were no gaps between the fibers. Next, the uncured GFRC was placed in a hydraulic press to apply pressure and allowed to cure for several days at room temperature. After curing, the functionalized GFRC was placed under a UV lamp for at least 24 hours to ensure dimerization of cinnamoyl groups.

Successful incorporation of cinnamoyl mechanophore by grafting onto surface of a glass fiber to investigate delamination effects has been demonstrated as described in this document. These mechanophores showed response during failure with single-ply systems; the response was significantly more sensitive with three-ply systems, occurring as early as 0.5% tensile strain.

III. Example Systems

An example system for detecting delamination of a fiber-reinforced polymer composite can include various components. In one example embodiment, a system includes a computing unit, an ultraviolet (UV) light source, and an ultraviolet (UV) camera in communication with the computing unit. The computing unit can include a processor and non-transitory memory. The non-transitory memory can store instructions that, when executed by the processor, cause the computing unit to perform various actions. The computing unit can be configured to receive an image from the UV camera, determine whether an intensity in the image exceeds a predetermined threshold, and when the intensity exceeds the predetermined threshold, determine that delamination of the fiber-reinforced polymer composite has occurred.

In some embodiments, the UV camera can include a bandpass filter configured to selectively allow 500 nm light to pass to the UV camera. In some instances, the predetermined threshold is a percent increase in intensity of light reflected from a surface of the fiber-reinforced polymer composite.

Figure 3:
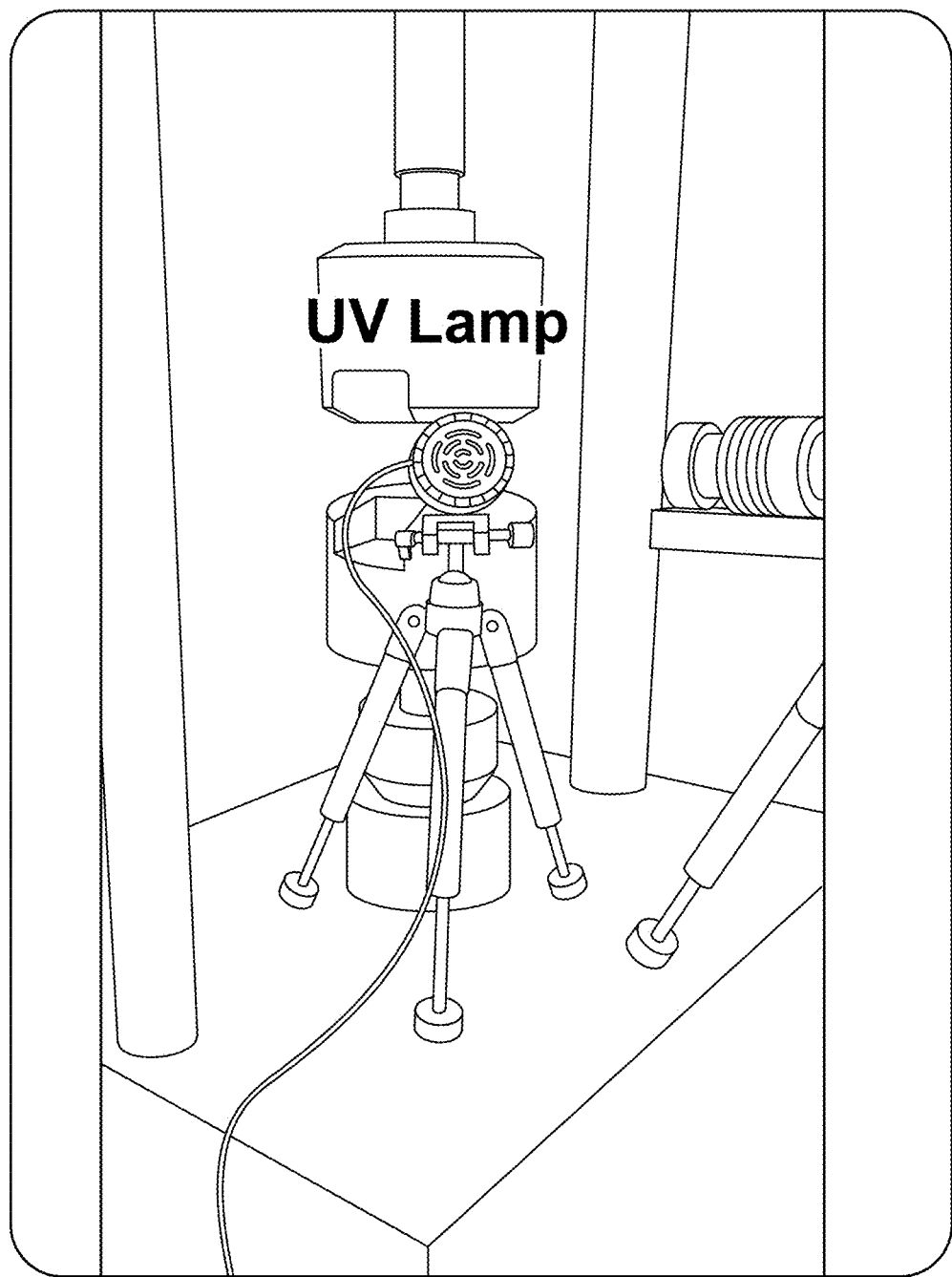
FIG. 3 shows a setup for mechanical loading tests using a servo-hydraulic load frame.

FIG. 3 shows an example system for mechanical loading tests using a servo-hydraulic load frame. An UV camera captures UV excited fluorescence from activated mechanophores. This allows for real-time monitoring of mechanophore embedded GFRP and CFRP composites, for example.

Figure 4A:
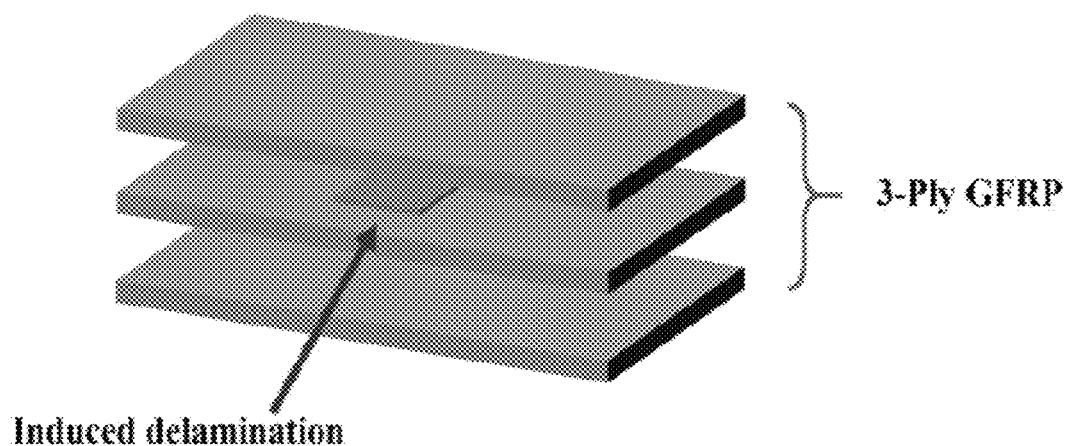
FIG. 4 shows induced delamination of a 3-Ply GFRP sample for testing optical response of mechanophore to in situ damage.
Figure 4B:
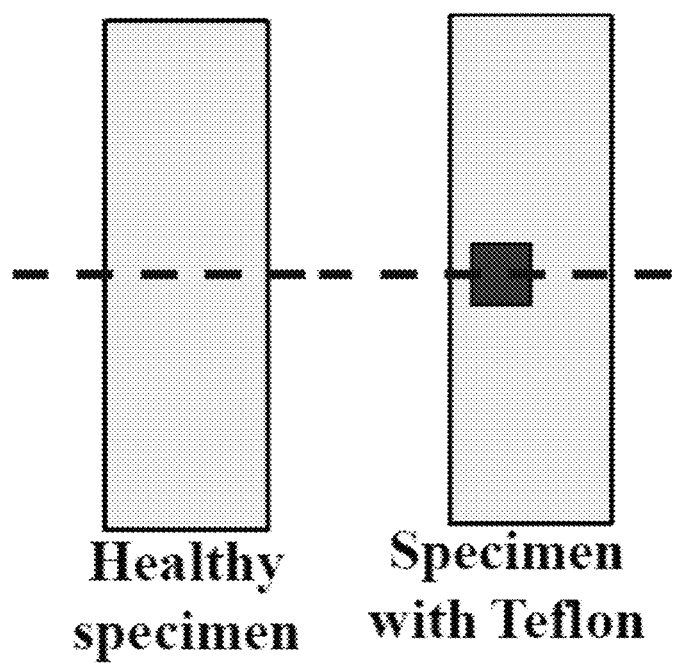
Figure 4C:
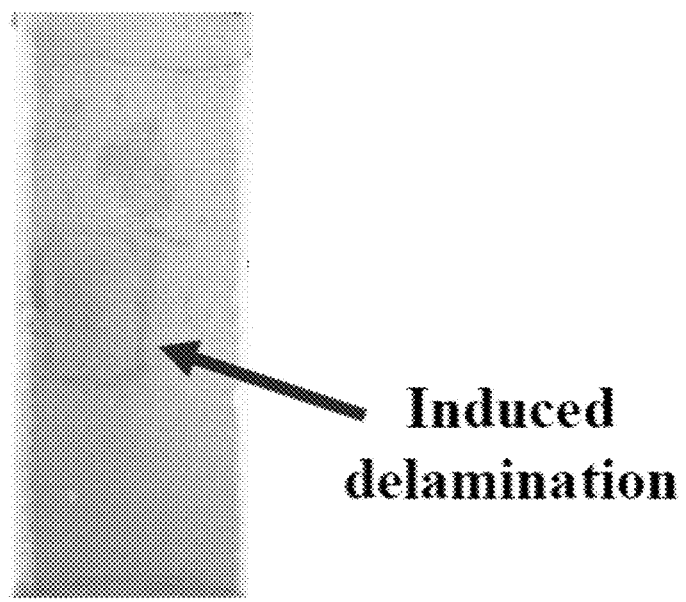

In an example implementation, In situ early damage detection in GFRP/CFRP (single/multiple-ply) specimens was demonstrated using an example experimental set up capable of real time detection of UV excited fluorescence from activated mechanophore. FIG. 4A-FIG. 4C show induced delamination of a 3-Ply GFRP sample for testing optical response of mechanophore to in situ damage.

Results showed early damage detection in GFRP composite specimens, prior to yield, under both quasi-static and fatigue loading. The intensity increased with increase in loading. Early damage detection was also observed in CFRP specimens under quasi-static loading. In situ interlaminar damage detection capability of mechanophore in GFRP/CFRP was also investigated. Significant mechanophore activation around an induced delamination was observed under quasi-static loading.

IV. Experimental Examples

In order to explore the use of Di-AC based mechanophore as real-time damage detection sensor in composites, several key challenges had to be addressed. These included: (i) mechanophore activation and damage sensitivity across the length scales (polymer matrix, fiber, interphase); (ii) stress relaxation phenomenon associated with displacement-controlled tensile tests which can affect mechanophore activation; (iii) nonlinear behavior around yield strain due to material heterogeneity.

To investigate these issues, an integrated test setup, capable of capturing a specific range of UV fluorescence (only fluorescence from activated Di-AC) during the mechanical loading tests was developed. The optical response of the mechanophore embedded composite specimens was studied under both quasi-static and fatigue loading conditions and the results show early damage detection capabilities in healthy specimens. Tests were also conducted to further investigate the feasibility of this concept for detection of in situ damage such as delamination in the specimens under loading.

A. Example Fabrication Processes and Characterization of Functionalized GFRP

A silane-based functionalization was proposed via grafting of the force responsive fluorescent molecules onto the surface of a glass fiber weave. Cinnamoyl grafted glass fibers were prepared by first cleaning glass fibers for 1 hour in a Piranha solution. After cleaning, rinsing with ethanol, and drying under a stream of nitrogen, the clean fibers were submerged in a toluene and (3-aminopropyl)triethoxysilane (APTES) solution for 4 hours. Depending on the desired thickness of the coating, both time submerged and the concentration of APTES could be altered. For most experiments, a monolayer of APTES on the surface of the glass fibers was targeted.

After rinsing the fibers with ethanol and drying under nitrogen once more, the fibers were submerged in a final solution of acetonitrile and cinnamoyl chloride for a minimum of 24 hours. The resulting fibers were then removed and once again rinsed with ethanol and dried under nitrogen.

Figure 5C:
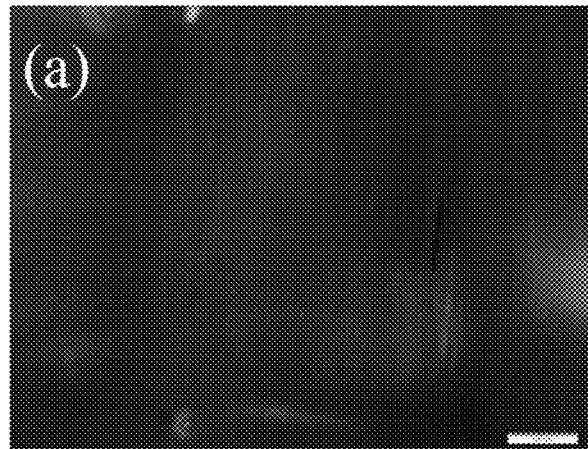
Figure 5C:
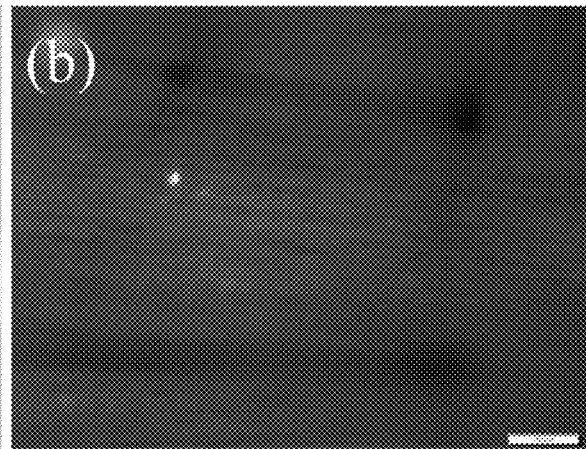
Figure 5C:
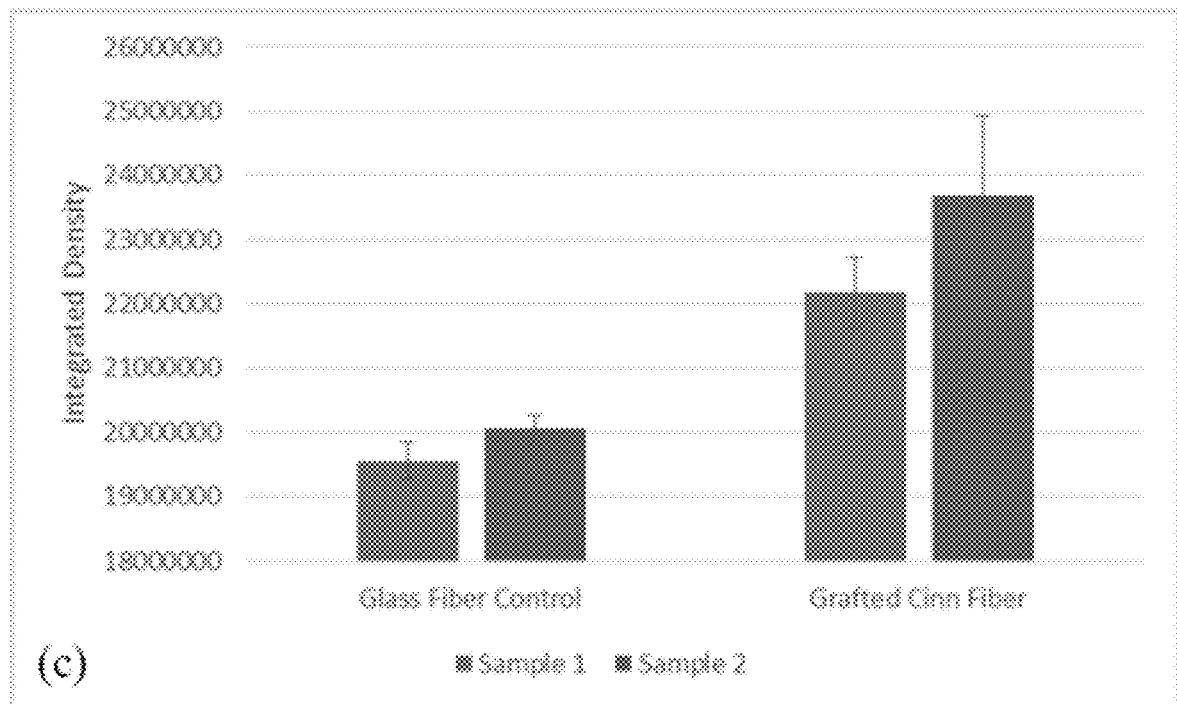

These functionalized glass fibers were then examined under a fluorescent microscope to observe any fluorescence changes between the untreated fiber and the functionalized fibers. Ten images were taken across the fiber surface to get an average fluorescent intensity. FIG. 5A shows a sample image of the untreated ("neat") fiber, and FIG. 5B shows a sample image of functionalized fibers. Due to the low intensity values of the images, brightness has been increased by 75% for each image for better visual contrast between the two samples. FIG. 5C shows a plot of average integrated density along with standard deviation among the ten images. Grafted fibers show a significant increase in intensity from untreated fibers.

GFRP composite specimens were prepared using glass fibers functionalized with cinnamoyl mechanophores and a standard epoxy resin and hardener as the matrix. Due to uncertainties of the effect of high temperature on the stability of the mechanophore functionalized glass fibers, the composites were cured while under loading with a simple hydraulic press at room temperature for 2 days. After the matrix was fully cured, samples were irradiated with 302 nm light for several days to ensure that cinnamoyl groups at the surface of the fibers could dimerize. Once UV irradiated on both sides of the composite, the samples were cut into strips and a notch was made to accelerate failure testing. Details of the fluorescent response results are disclosed below.

Figure 6A:
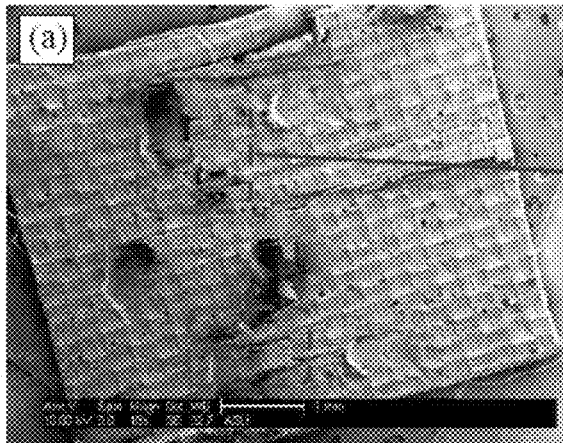
FIG. 6A-FIG. 6D show SEM images for (a) an overview of an untreated epoxy GFRP composite sample with areas of delamination highlighted, (b) an enlarged image of delamination in the untreated epoxy GFRP composite specimen, (c) an overview of a grafted GFRP composite specimen with areas of delamination highlighted, and (d) an enlarged image of delamination in the grafted GFRP composite specimen.
Figure 6B:
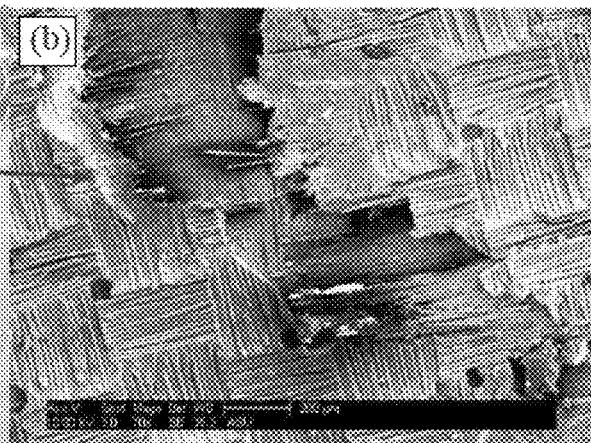
Figure 6C:
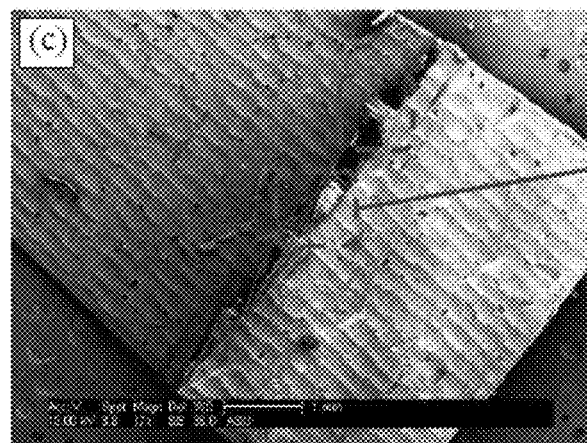
Figure 6D:
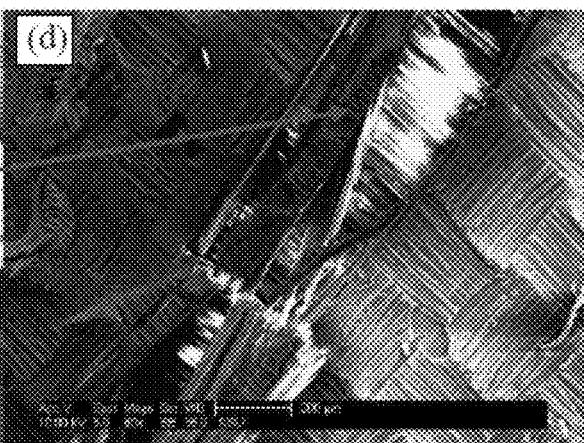

With regard to characterization of specimens, single-ply cinnamoyl-grafted GFRP composite samples which had undergone tensile loading to fatigue were examined via scanning electron microscope (SEM) imaging to observe potential effects of functionalization on delamination within the GFRP composite specimen. The damaged sections of the composite were cut off and imaged using SEM, as seen in FIG. 6A—FIG. 6D. FIG. 6A is an overview of untreated epoxy GFRP composite sample with areas of delamination highlighted. FIG. 6B is an enlarged image of delamination in neat epoxy GFRP composite specimen. FIG. 6C is an overview of grafted GFRP composite specimen with areas of delamination highlighted. FIG. 6D is an enlarged image of delamination in grafted GFRP composite specimen.

Due to the method of functionalizing the surface of the glass fibers, it is hypothesized that unreacted amine groups on the surface of the fibers can bond to the epoxy matrix covalently, helping to prevent potential delamination. While examining SEM images is not necessarily quantitative, it may give a visual representation of the damage occurring within each sample. From FIGS. 6A-6D, it is apparent that the untreated epoxy GFRP composite specimens do in fact display more delamination than their grafted counterparts for the specific samples examined.

B. Optical Response of Interlaminar Damage in Functionalized GFRP

Figure 7A:
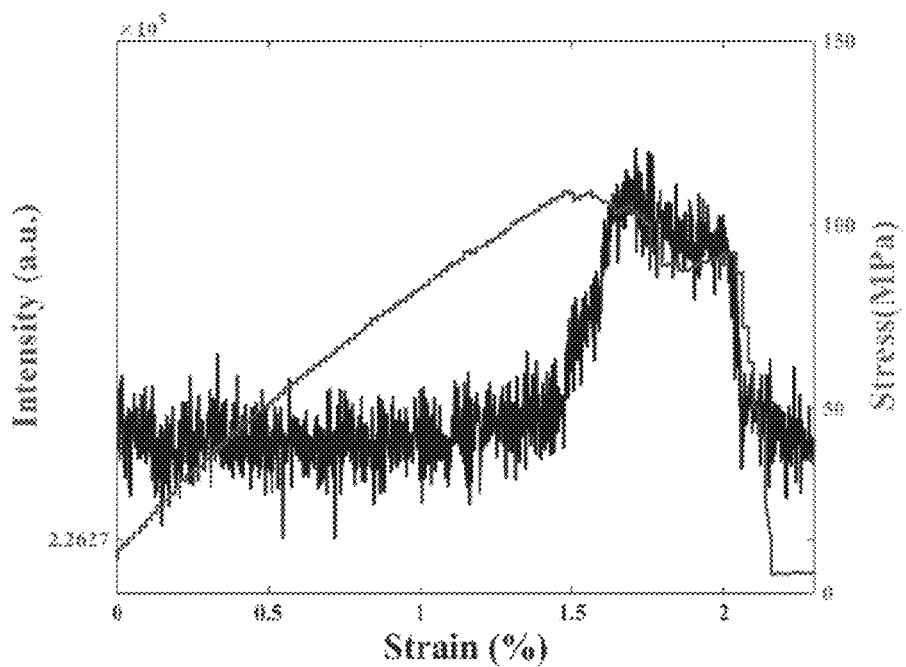
FIG. 7A-FIG. 7B show (a) stress-strain curve and intensity data for a sample made with functionalized glass fibers, and (b) stress-strain curve and intensity data for an untreated epoxy GFRP composite specimen.
Figure 7B:
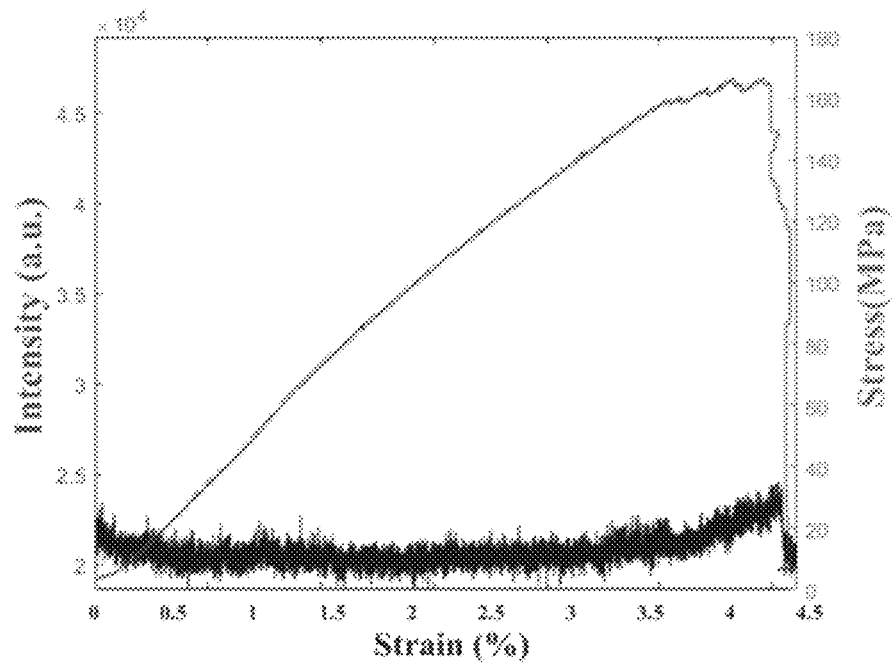

Single-ply GFRP samples containing fibers coated with cinnamoyl monolayer were first tested in order to examine the potential response that could be observed via an example experimental system. FIG. 7A shows a stress-strain curve overlaid with intensity information gathered via a UV camera for a sample made with functionalized glass fibers. FIG. 7B shows a stress-strain curve overlaid with intensity information gathered via a UV camera for a sample made with untreated epoxy GFRP composite specimen.

From FIG. 7A, it can be seen that for a monolayer system, signal response is observed as early as 1.5% strain, just as failure initiates. Additionally, this response behaves differently from untreated epoxy GFRP composite specimens with non-functionalized glass fibers (FIG. 7B). Both untreated and functionalized samples show a sharp decrease in intensity after complete failure due to splitting in the sample and increased void space—areas of image not containing fiber surface due to failure and stretching—in the image. However, functionalized GFRP composite samples show a sharp increase in signal intensity before this occurs, which may be attributable to signal response from the activated cinnamoyl groups.

In an attempt to improve the signal intensity of the composites made with functionalized glass fiber composites, samples were made in which the coating thickness was not controlled to allow for more reactive sites at the surface of the fibers. Samples were submerged in a solution with a higher concentration of (3-aminopropyl) triethoxysilane for a longer period of time (24 hours, as opposed a monolayer time of 4 hours), such that the fiber surface is saturated with the coating. These conditions yield a much thicker coating on the fiber surface, but the thickness is difficult to control and therefore some unevenness is expected. While these glass fibers still produced a similar response to the monolayer fibers, the intensity of the response decreased slightly. It is hypothesized that while it indeed may have a thicker coating of reactive sites, these sites were likely not as exposed due to crowding at the fiber surface, limiting the surface reaction to attach cinnamoyl groups.

Figure 8A:
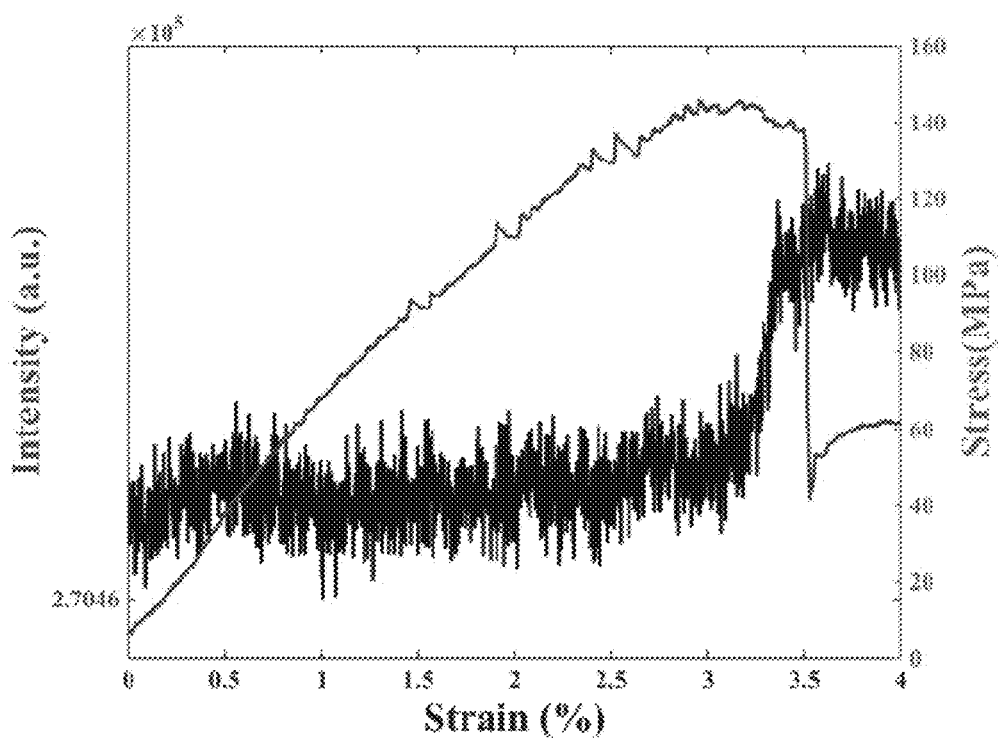
FIG. 8A and FIG. 8B show stress-strain curve and intensity data for two separate trials of composites made with functionalized glass fibers in which the coating thickness was uncontrolled.
Figure 8B:
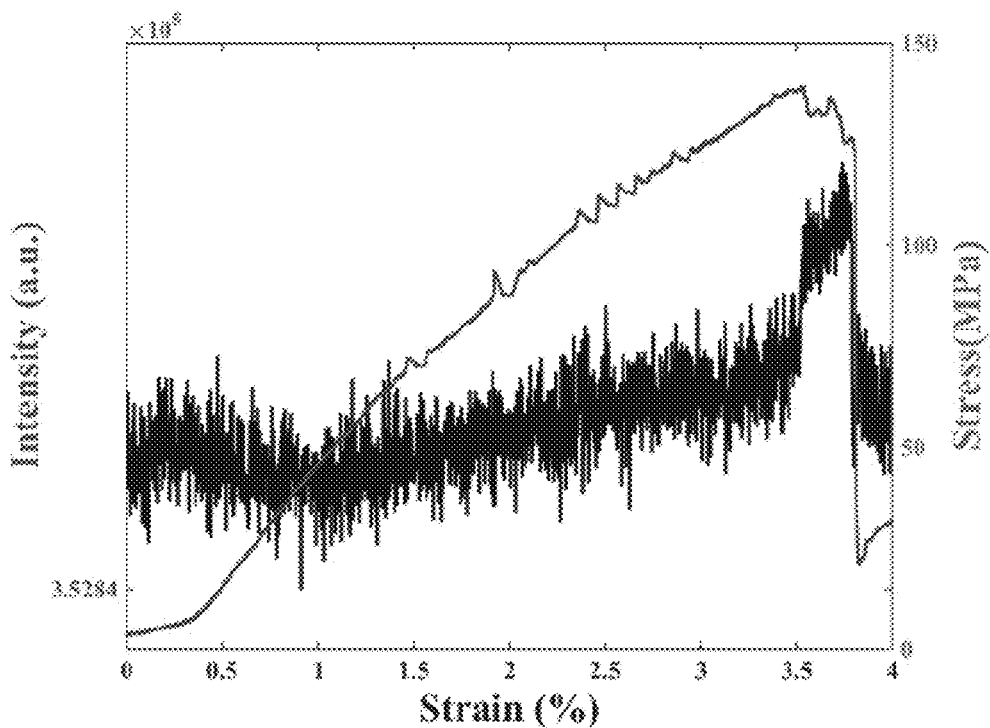

FIG. 8A and FIG. 8B show the responses gathered for two separate samples of the uncontrolled coating of functionalized glass fibers within a GFRP composite sample. It can be seen in one sample that it lacks the characteristic "drop" in intensity after failure. This may be due to the fact that most of the crack propagated out of the observed region, causing most of the sample to remain in view without increasing void space. However, the stress response from the cinnamoyl groups was still captured.

While detection capability from the previous results was proven to work for single-ply systems, single-ply systems are not generally a realistic representation for composite thickness. Therefore, the next step was to add additional layers in attempt to maintain the sensitivity while improving mechanical strength. To ensure sensing capabilities are maintained for higher-ply systems, the potential effects of increasing the number of layers was examined.

The detection capability of mechanophores in a grafted fiber system may be limited by the amount of dimerized mechanophore at the surface of the fibers. If too few mechanophore units are dimerized at a given area, detection in that area is not achievable. This can be overcome by either limiting the thickness of the sample so that UV-curing can penetrate the entire thickness of the sample or UV-curing each functionalized layer separately before incorporating them into a multi-ply laminate. Because the tested samples were three-ply (approximately 0.65 mm) lay-up, this effect was not dominant and UV-irradiating after the laminate is fully cured was feasible.

Figure 9A:
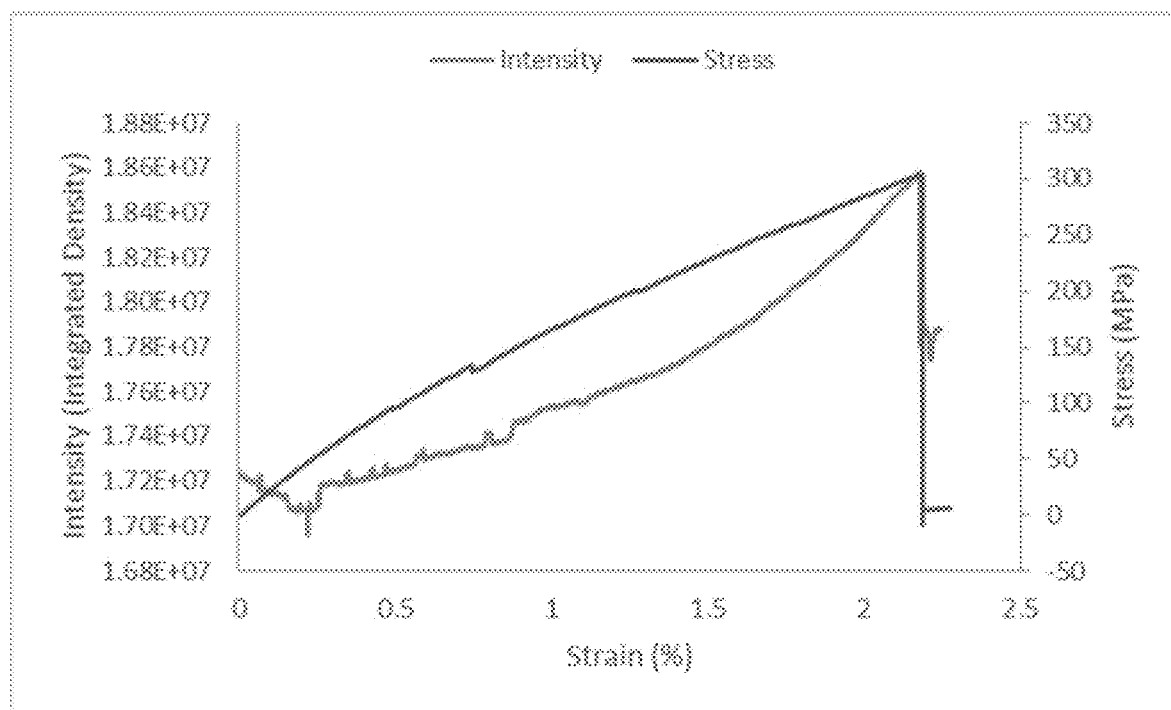
FIG. 9A and FIG. 9B show stress-strain curve versus fluorescent intensity data for two separate samples of a notched three-ply mechanophore functionalized glass fiber reinforced polymer composite specimen.
Figure 9B:
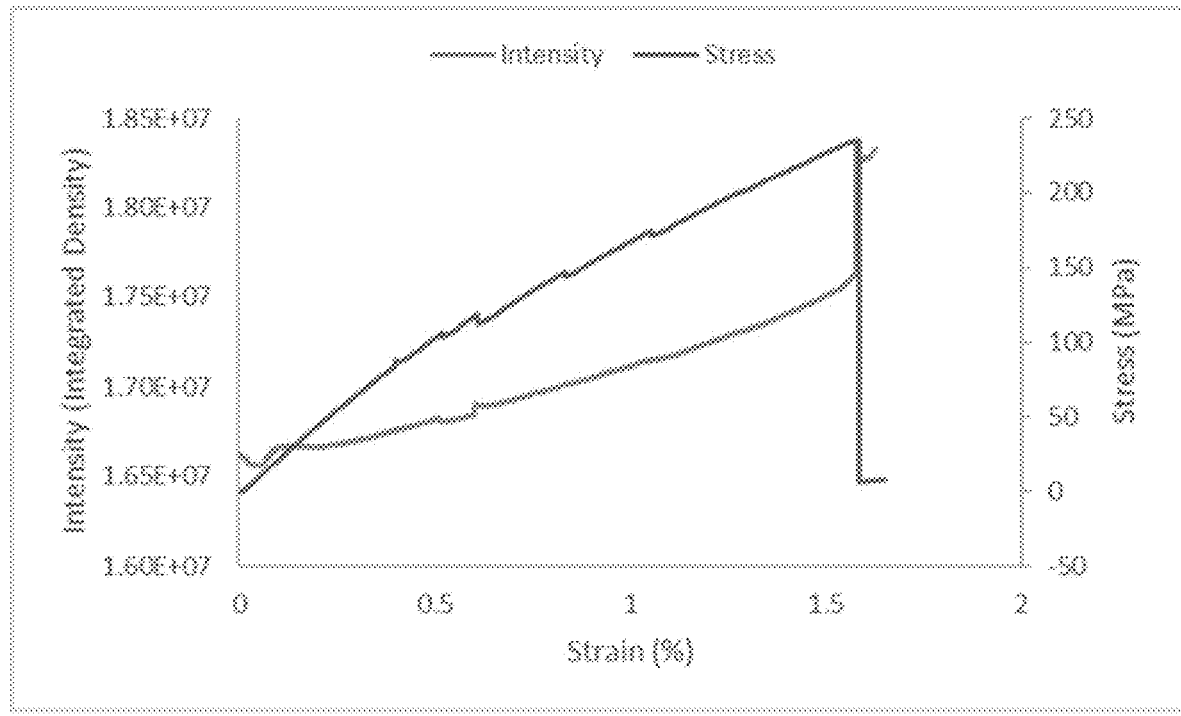
Figure 10A:
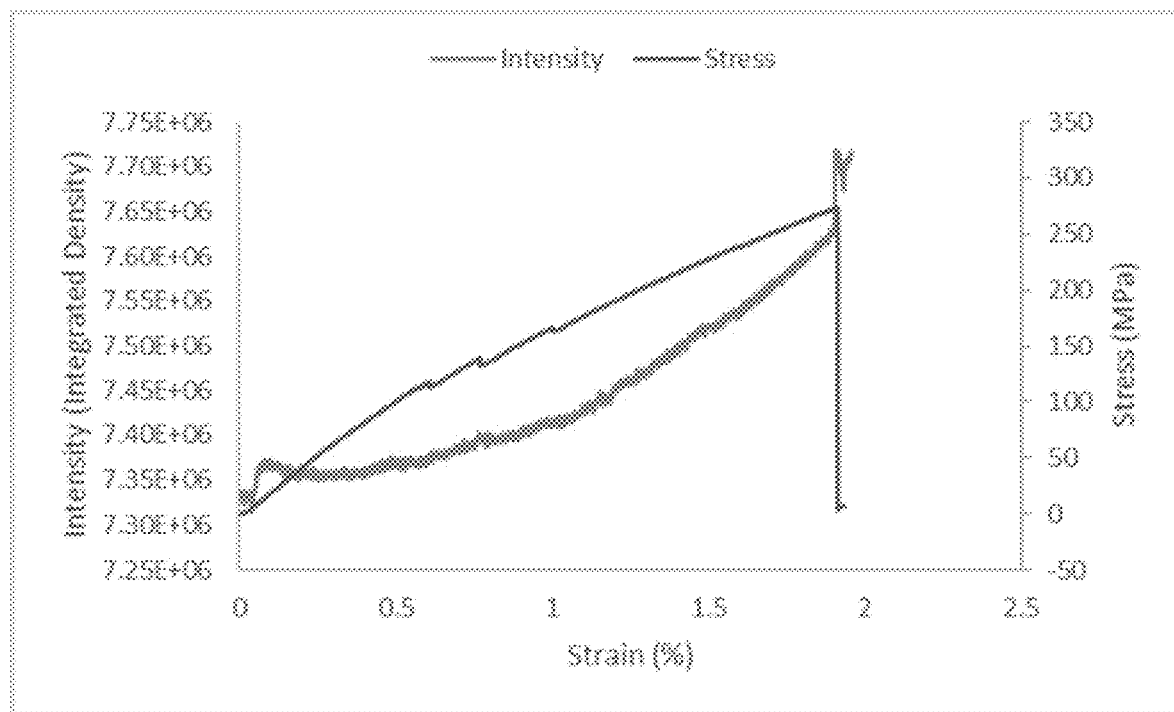
FIG. 10A and FIG. 10B show stress-strain curve versus fluorescent intensity data for two separate samples of an un-notched three-ply mechanophore functionalized glass fiber reinforced polymer composite specimen.
Figure 10B:
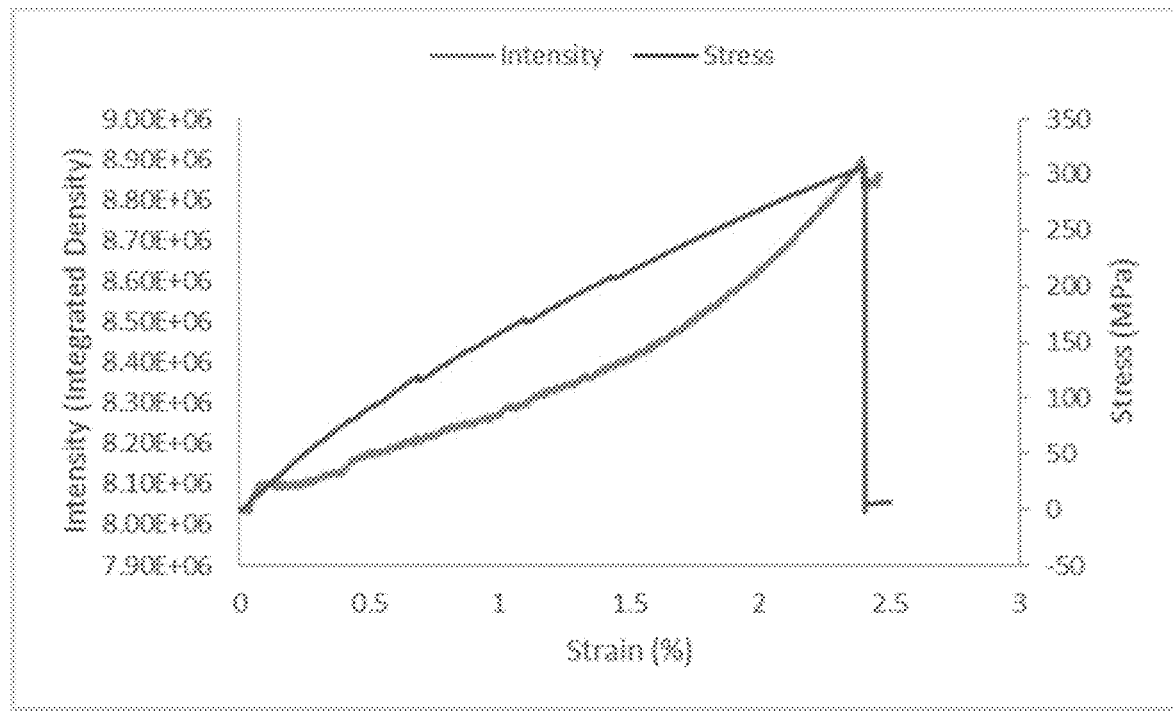

Tests were conducted using both notched and un-notched three-ply GFRP composite specimens. The mechanophore activation was characterized using the MTS servo-hydraulic load frame integrated with a UV lamp/camera. A quasi-static loading test was performed and the desired wavelength range (500 nm) was achieved using a band pass filter. FIG. 9A and FIG. 9B show the results of the notched samples, while FIG. 10A and FIG. 10B show the results of the un-notched samples. The samples depicted in FIG. 9A—FIG. 9B and FIG. 10A-FIG. 10B received the same treatment, except for one being notched and one being un-notched.

For both notched and un-notched samples, there is a noticeable increase in fluorescence intensity before failure. This behavior was not present in single-ply grafted mechanophore GFRP composite specimens, which only showed an intensity spike slightly before failure. This could be attributed to the higher concentration of mechanophore in the three-ply systems, which resulted in an overall increase in total fluorescence captured by the UV-camera. Additionally, the intensity trend observed in these samples follows an exponential behavior, as opposed to the linear increase seen in Di-AC embedded systems. It is speculated that stress concentrations at the matrix-fiber interface contributes to the nonlinear behavior.

C. In Situ Damage Precursor Detection in Fiber Reinforced Composites

1. Synthesis and System Configuration

Under an UV lamp of 302 nm wavelength, 9-anthracene carboxylic acid (AC) was photodimerized in solution. After the photodimerization, the white dimerized 9-anthracene carboxylic acid (Di-AC) powder particles were obtained and mixed with epoxy resin and hardener (DGEBF and DETA, weight ratio 100:27, 5 wt % Di-AC) for polymer matrix composites fabrication. Di-AC embedded single/multiple-ply GFRP/CFRP composite specimens were fabricated with this mixture. The laminate was cut into small specimens for mechanical loading tests. A small notch (about 1 mm) was generated at the middle of the left edge of the specimens, which facilitated monitoring of the relationship between damage evolution and mechanophore activation.

Figure 11A:
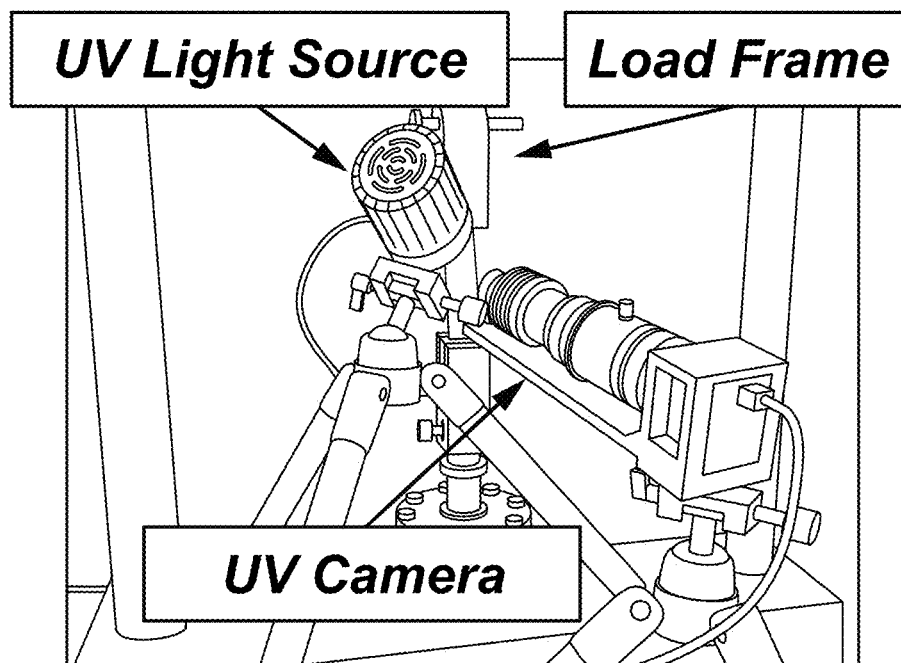
FIG. 11A shows an in situ damage detection experimental setup.
Figure 11B:
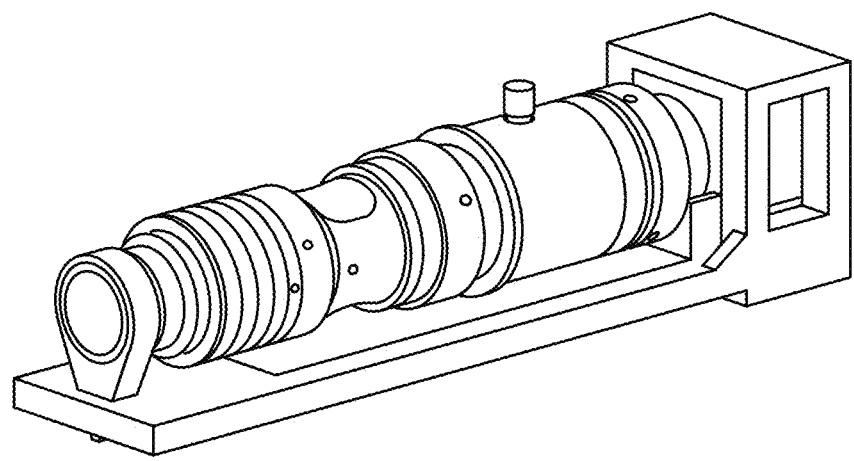
FIG. 11B shows an UV camera mount made by a 3D printer.

In situ mechanophore activation under mechanical loading was captured through the new experimental set up in real time. The system comprises an UV lamp, camera, and a load frame (e.g., MTS servo-hydraulic/TestResource 800 L electronic universal test frame). The UV lamp emits a wavelength of 365 nm which excites activated Di-AC. The UV camera captures UV excited fluorescence emitted from the activated Di-AC using an appropriate bandpass filter. This filter helps reduce the external noise and select only fluorescence emission from activated mechanophores during mechanical loading tests. FIG. 11A shows the experimental set up; FIG. 11B shows a 3-D printed mount used to hold the camera, lens, and filter in place. A custom MATLAB program was developed to plot the intensity of the composite specimen by measuring the brightness of each pixel of the UV camera. Quasi-static loading and fatigue tests were performed, and the optical responses were investigated. The effect of fiber type (glass/carbon), number of plies, and damage (notch/interlaminar damage) on mechanophore activation was investigated.

2. Quasi-Static Loading Tests

Figure 12A:
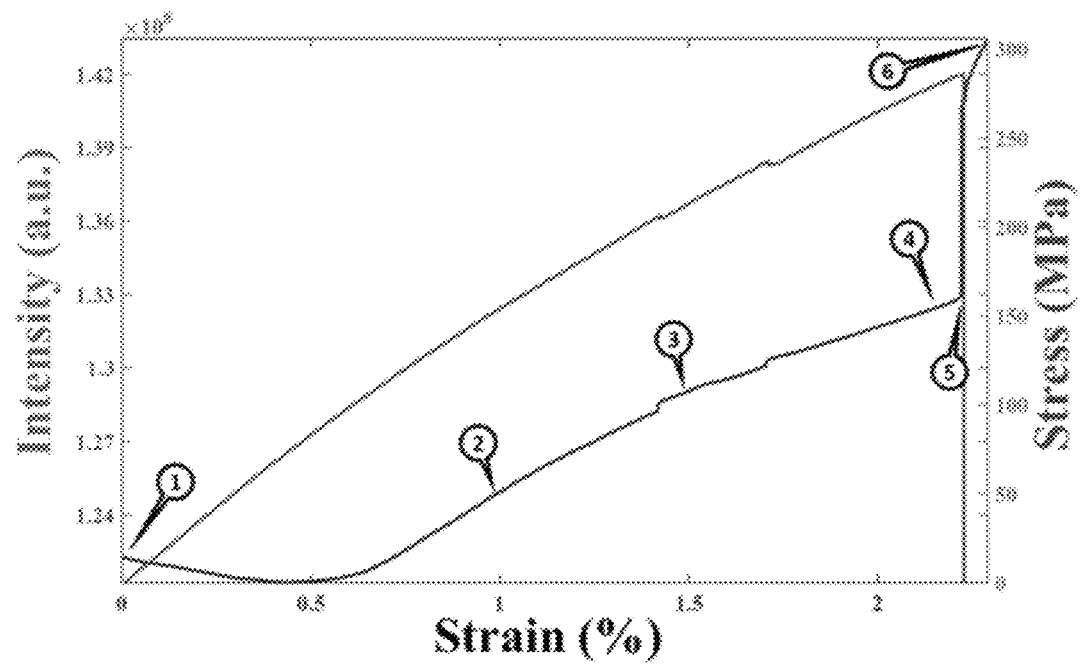
FIG. 12A shows stress-strain curve vs. fluorescence intensity data of a Di-AC embedded multiple-ply GFRP sample.
Figure 12B:
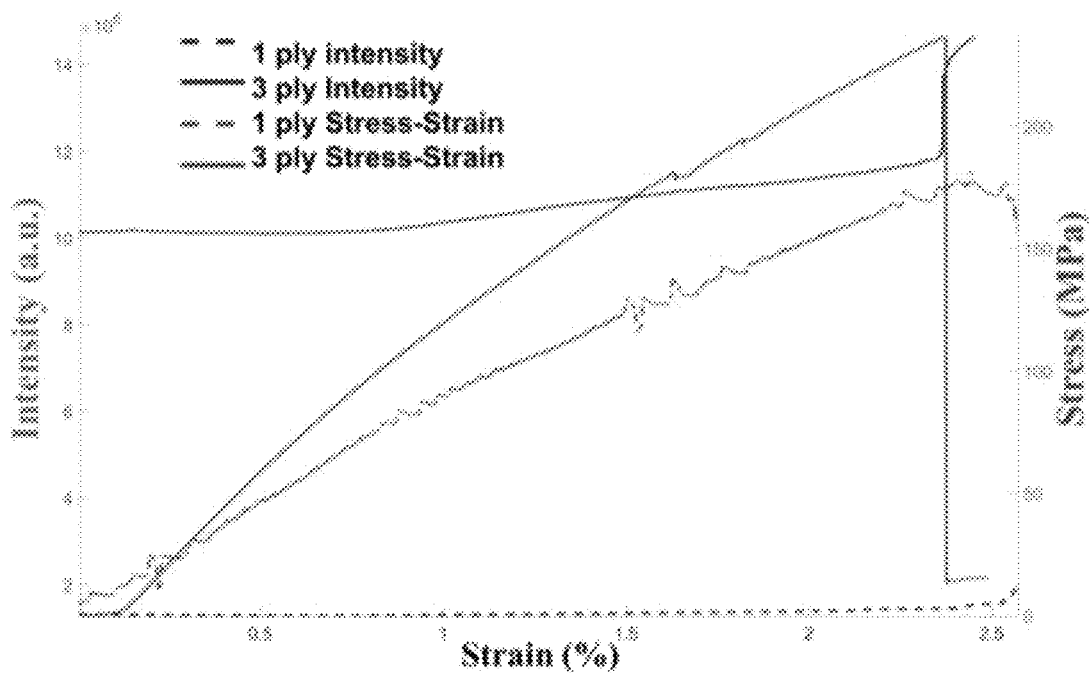
FIG. 12B shows a mechanical property and intensity comparison between Di-AC embedded single-ply GFRP and Di-AC embedded multiple-ply GFRP.
Figure 13A:
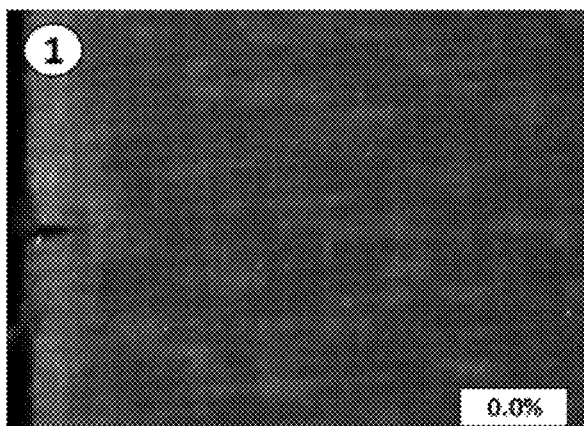
FIG. 13A-FIG. 13F show images of a Di-AC embedded three-ply GFRP composite sample taken with an UV camera.

Quasi-static loading tests were performed on mechanophore embedded GFRP composite specimens. To fabricate the samples, 5 wt % of Di-AC and three glass fiber laminae were used. The tensile load tests were performed under quasi-static conditions with 0.0032 mm/sec strain rate at room temperature. The UV camera was able to record the crack initiation, growth, and the associated fluorescence in real time, illustrating the potential of mechanophores for early damage detection. A linear relationship between intensity and strain was also observed from 0.7% to yield strain as shown in FIG. 12A. FIG. 12B shows mechanical property and intensity comparison between Di-AC embedded single-ply GFRP and Di-AC embedded multiple-ply GFRP. FIG. 13A-FIG. 13F presents optical images of the GFRP composite specimen at various loading stages. FIG. 13A corresponds to the beginning of the loading; hence, the corresponding optical image is considered a baseline fluorescence image. Significant difference in intensity between the baseline image and the images at higher loading can be seen in FIG. 15B-FIG. 15F.

Figure 13B:
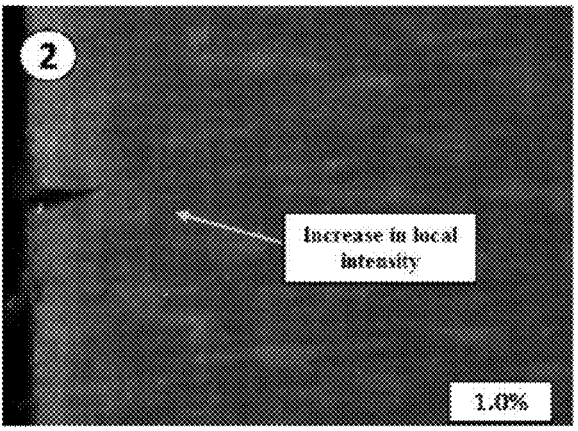
Figure 13C:
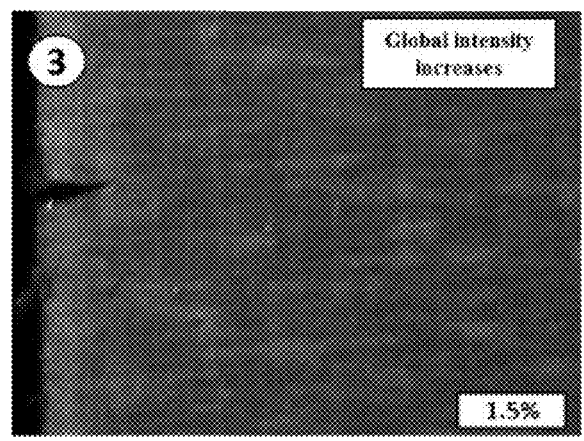
Figure 13D:
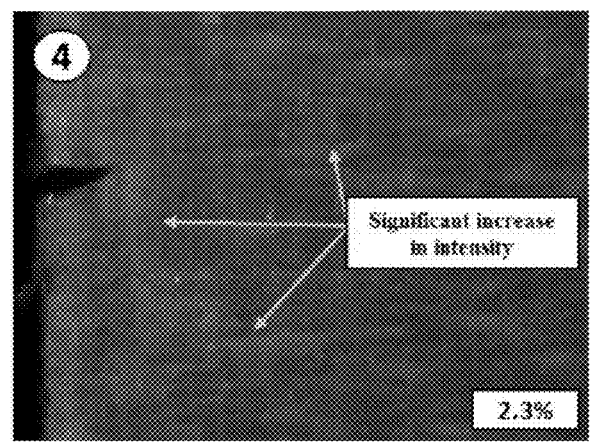
Figure 13E:
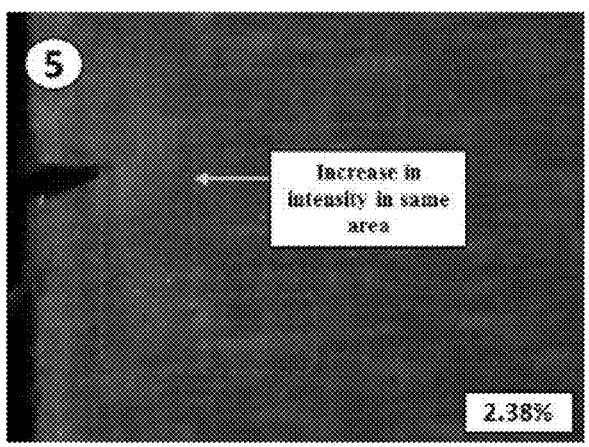
Figure 13F:
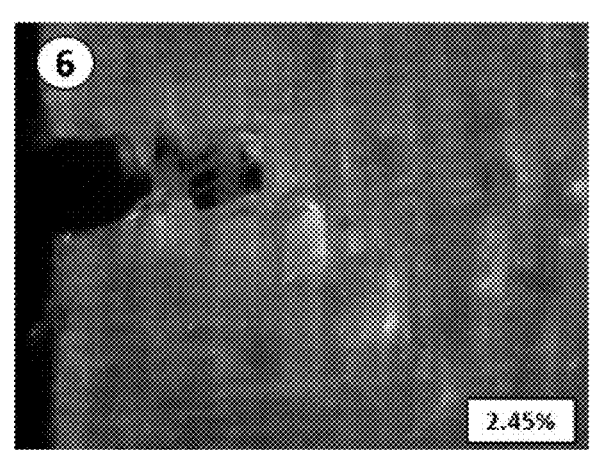

At 1% strain, an area with higher intensity of mechanophore fluorescence was observed near the notch as shown in FIG. 13B. Noticeable striped patterns with high intensity were observed as shown in FIG. 13C. FIG. 13D shows a significant increase in intensity over a large area near the notch and additional mechanophore activations are observed in regions further away from the notch. These high intensity areas grew into one larger area as strain increased (FIG. 13E). Complete failure of the sample occurred at 2.45% strain (FIG. 13F). A large amount of mechanophore was activated during this process, which led to the significant increase in intensity (see FIG. 12A).

A comparative study conducted between the three- and single-ply glass fiber specimens shows that, in general, the intensity and intensity ranges were much greater in the case of the multiple-ply specimens as shown in FIG. 12B. This may be because of the mechanophore activation occurring within the laminate could be captured by the UV camera due to the translucency of glass fiber. Both samples showed a linearly increasing trend between intensity and strain. The multiple-ply sample had a higher yield strength, but it failed at a lower strain than that of single-ply GFRP due to increased brittleness. These results further show the feasibility of mechanophore for self-sensing and early damage detection in GFRP composite samples. In particular, the significantly improved fluorescence in the multiple-ply case indicates potential for structural scale applications.

3. Fatigue Tests

Figure 14:
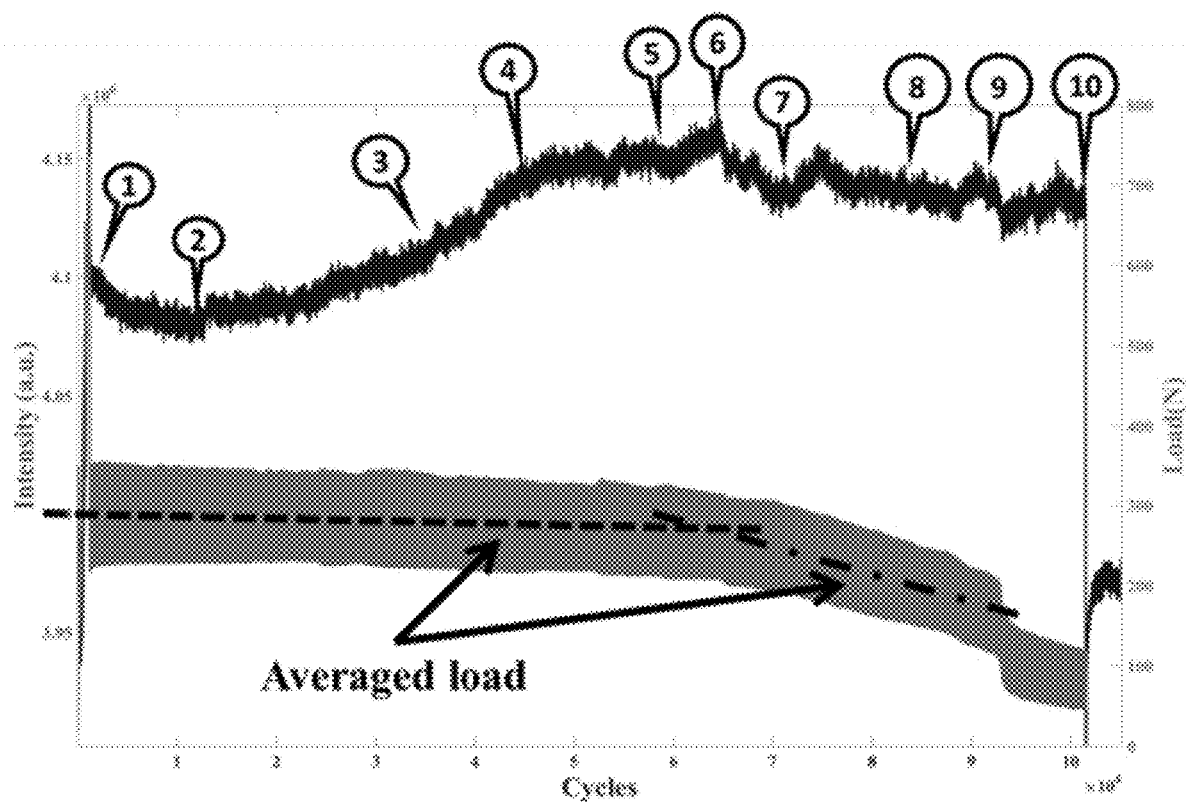
FIG. 14 shows experimental fluorescence intensity vs. fatigue loading data.

Fatigue loading tests were conducted on the Di-AC embedded single-ply GFRP specimens to investigate the capability of early fatigue damage initiation and subsequent propagation behavior. The epoxy-mechanophore mixture was prepared with 5 wt % mechanophore for a single glass fiber ply (100×18.5×0.3 mm$^3$). The specimens were mounted on the load frame and ramped to 3% strain, following which they were cycled between 0.6% to 3% strain at 20 Hz until complete failure. Multiple tests were conducted, and results are presented for a representative test case. The UV camera was able to record the crack initiation, growth, and the associated fluorescence in real time, illustrating the potential of mechanophores for the detection of fatigue damage precursor. The load was also recorded in the load frame. The results show increase in fluorescence intensity with fatigue cycle as shown in FIG. 14.

Figure 15A:
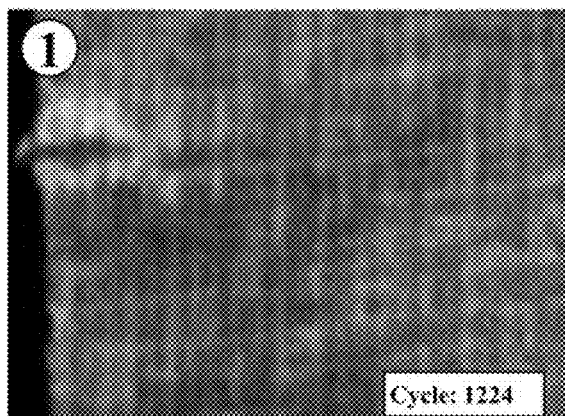
FIG. 15A-FIG. 15J show images of a Di-AC embedded GFRP specimen taken with an UV camera.
Figure 15B:
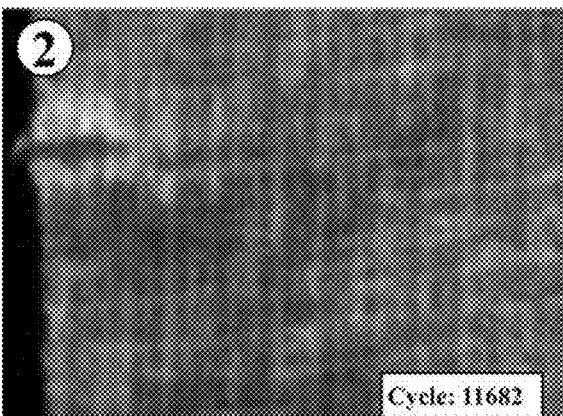
Figure 15C:
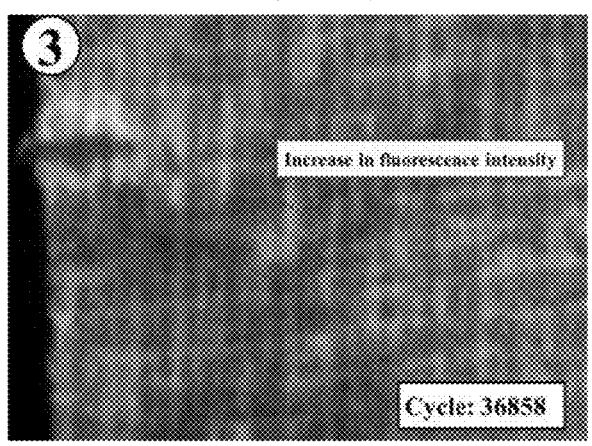
Figure 15D:
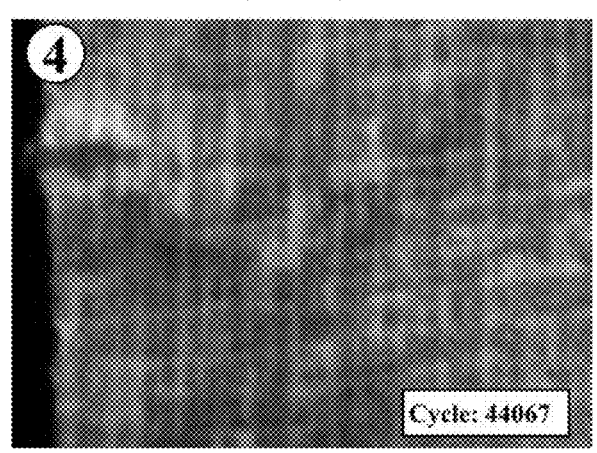
Figure 15E:
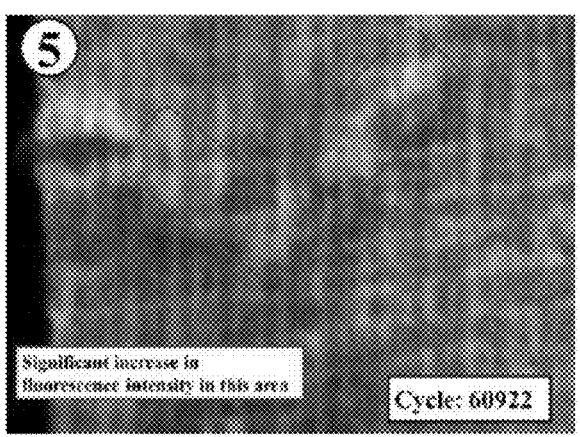
Figure 15F:
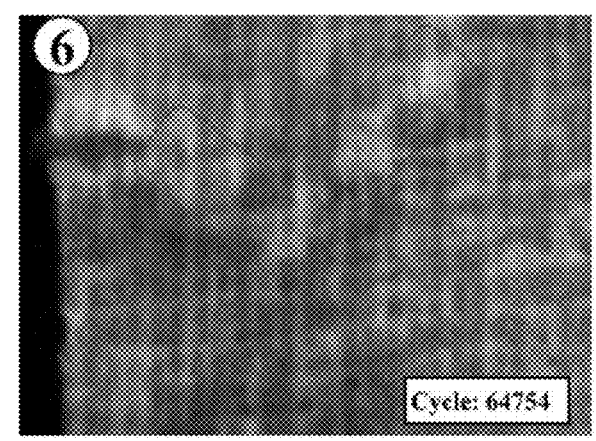
Figure 15G:
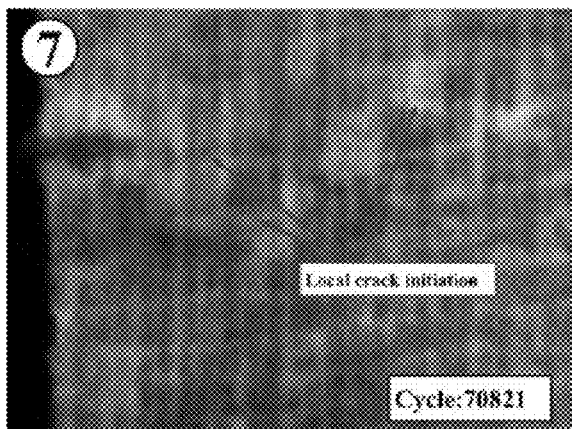

FIG. 15A-FIG. 15J show optical images of the GFRP sample taken at various stages of the fatigue test. FIG. 15A shows the sample at the beginning of the fatigue test when ramp is completed; no crack initiation is observed. After the first 11,000 fatigue cycles, the lowest intensity of fluorescence was measured in FIG. 15B; this is referred to as the baseline fluorescence image here. This decrease in intensity could be attributed to partial mechanophore activation during the ramp stage; causing these activated mechanophores to dimerize (heal) by the UV lamp. Although the UV lamp was used to excite mechanophores, the UV source also dimerizes the mechanophores since the spectrum of wavelength of the UV lamp follows a Gaussian distribution which may include spectrum of UV light suitable for dimerization (healing). In FIG. 15C, a noticeable intensity increment indicating significant activation of mechanophores in the matrix region is observed. However, the trend of the averaged load (black dotted line in FIG. 14) shows negligible decrease as the fatigue test progresses; therefore, it can be hypothesized that during most part of the fatigue tests the damage is confined to the polymer matrix. FIG. 15E and FIG. 15F show significant increase in intensity in the region marked with a red dotted line.

Figure 15H:
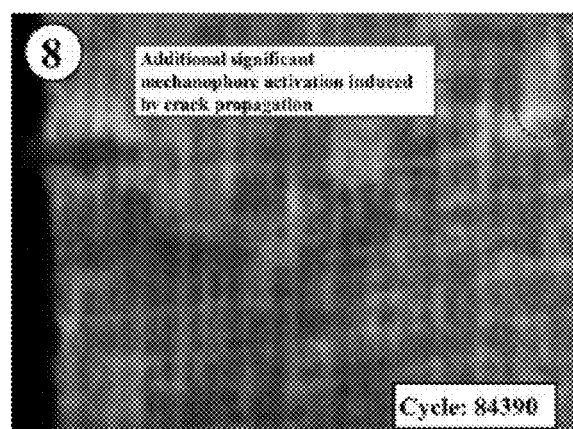
Figure 15I:
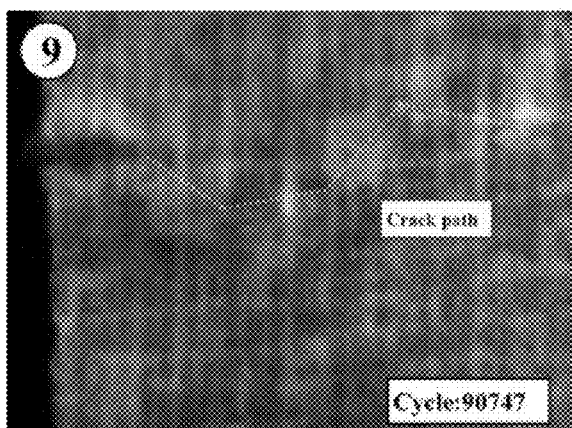
Figure 15J:
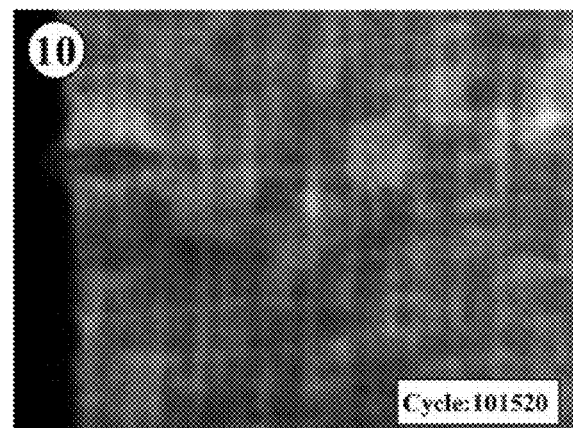

The optical images show a possible crack propagation path. There is a significant change in slope of average load between 0-65,000 cycles (black dotted line) and 65,000-90,000 cycles (black dash-dotted line) in FIG. 14; this transition can be attributed to crack initiation. Sites with through-thickness microcracks can be observed in the form of regions with very low intensity surrounded by high intensity in FIG. 15G. Crack propagation activated more mechanophores ahead of the crack-tip indicating severe plastic deformation in the crack-tip plastic zone, as shown in FIG. 15H. With subsequent loading cycles, the sample fails, with the cracks visualized by the intensity of fluorescence of activated mechanophores in real time (FIG. 15I and FIG. 15J). The observed phenomena were seen to be consistent under a repeatability study showing the potential of mechanophore as a fatigue damage precursor sensor.

4. Quasi-Static Loading Tests of Delaminated Samples

Figure 16:
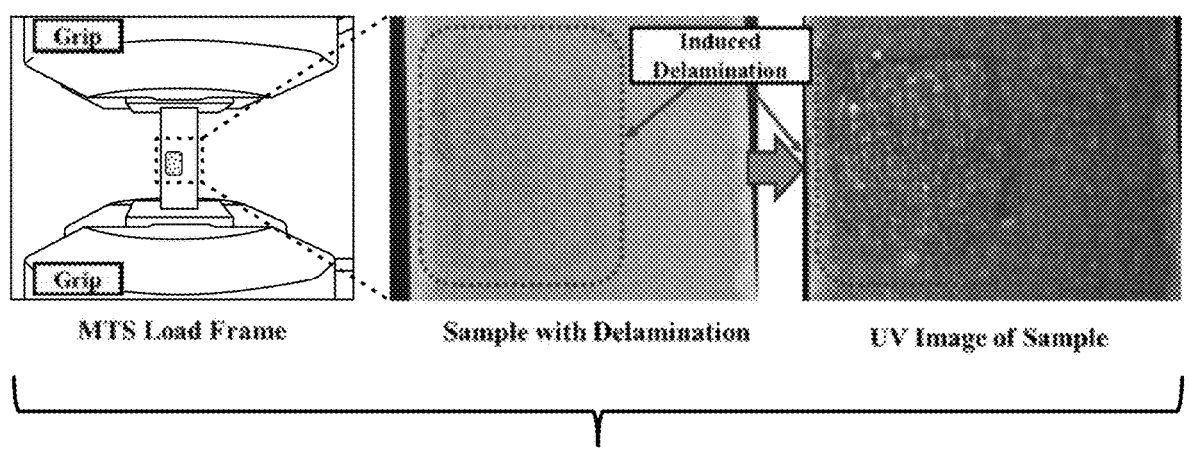
FIG. 16 shows an example MTS load frame with a specimen (left), a visible image (middle), and a reflected UV image of the specimen (right) shown.
Figure 17A:
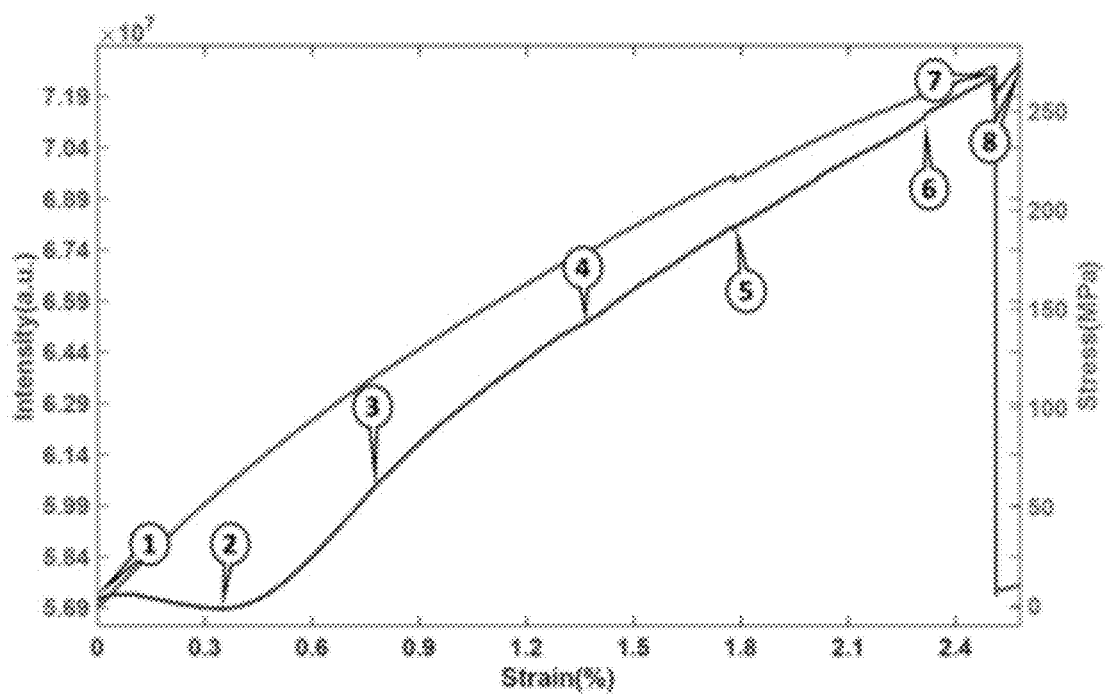
FIG. 17A shows stress-strain curve vs. fluorescence intensity data of a Di-AC embedded three-ply GFRP sample with induced delamination.
Figure 18A:
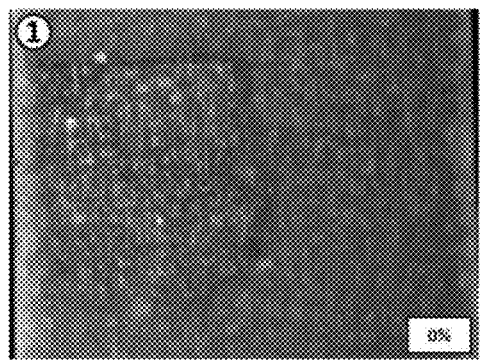
Figure 18B:
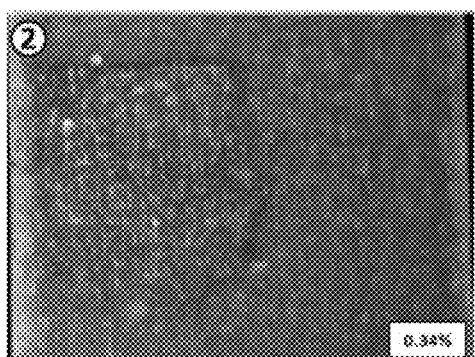
Figure 18C:
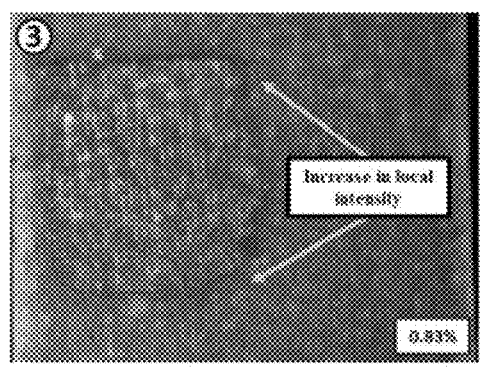
Figure 18D:
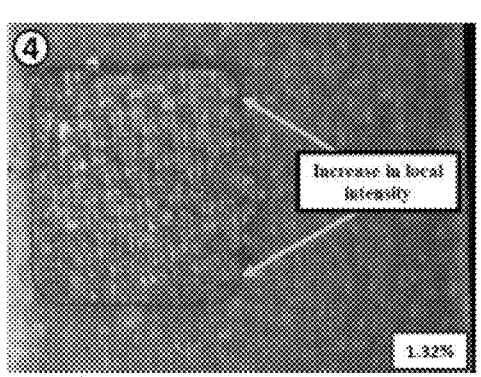
Figure 18E:
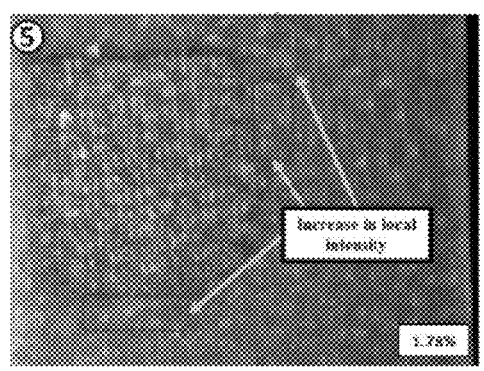
Figure 18F:
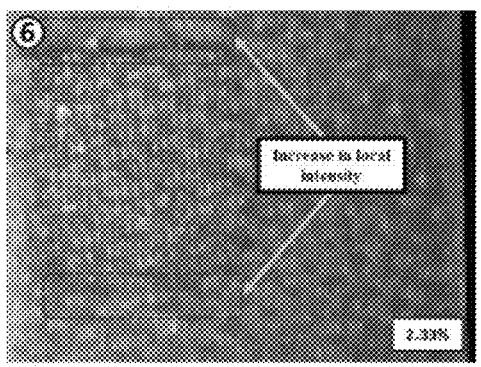

The optical response of multiple-ply laminates with delamination was characterized to study the effects of interlaminar damage. Three-ply glass fiber composite specimens with 5 wt % Di-AC (embedded in the polymer matrix) were fabricated with delamination introduced by inserting a single layer of Teflon near the left edge of the specimen (FIG. 16). A near linear trend between intensity and strain was observed between 0.34% to 2.5% strain as shown in FIG. 17A. FIG. 18A-FIG. 18H present optical images of the GFRP composite specimens taken at various loading stages. FIG. 18A shows the sample at the beginning of the test and the lowest intensity of fluorescence was measured at 0.34% strain (FIG. 18B); this is referred to as the baseline fluorescence image. This decrease in intensity could be attributed to partial mechanophore activation due to the notch, causing these activated mechanophores to dimerize (heal) by the UV lamp. Significant difference in intensity between the baseline image and the images obtained at higher loading can be seen in FIG. 18C-FIG. 18H. At 0.83% strain, intensity in the region of the induced delamination increases significantly as shown in FIG. 18C. With increase in loading, noticeable stripes of higher intensity were observed (FIG. 18D). After 1.78% strain, visible increment in intensity at the edge of the Teflon was observed as shown in FIG. 18E. Specifically, a large intensity increment in the vicinity of the delamination was identified at around 2.4% strain as shown in FIG. 18F and FIG. 18G. Complete failure of the sample occurred at 2.55% strain as shown in FIG. 18H. These results illustrate the potential of using mechanophores not only for early damage detection, but also for detecting in situ damage in composites.

Figure 17B:
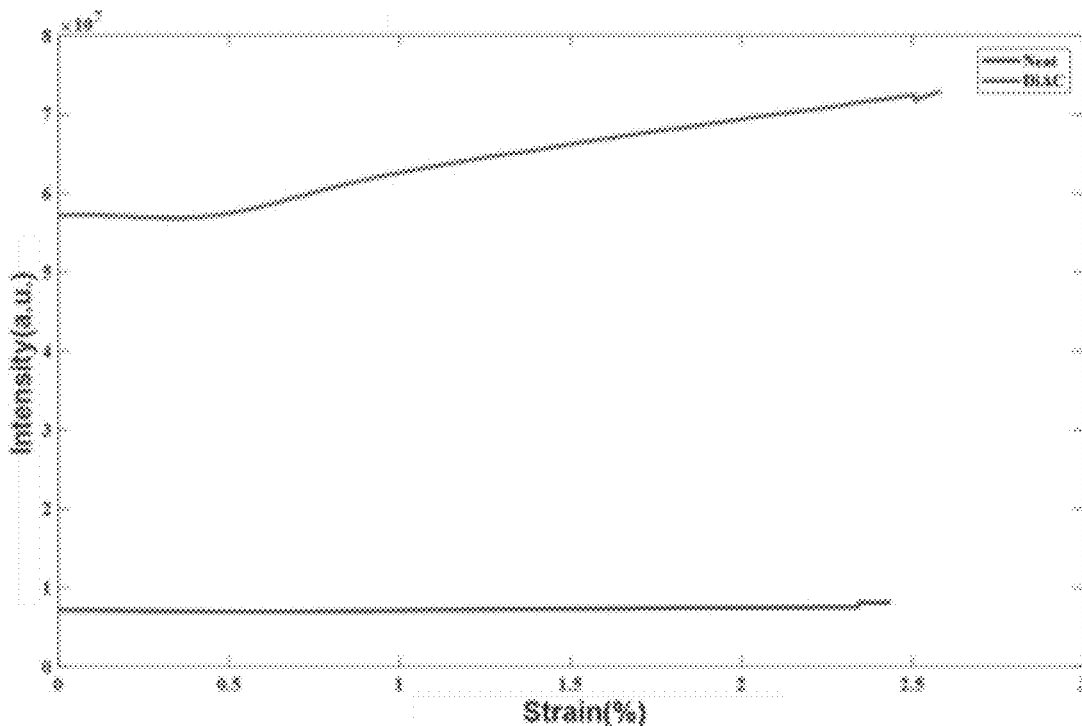
FIG. 17B shows an intensity increment comparison between Di-AC embedded GFRP and a control sample (untreated epoxy).

A comparative study between the untreated epoxy GFRP (control sample) and Di-AC embedded GFRP was performed under the same quasi-static tensile loading to study the effect of mechanophore in GFRP composite specimen with delamination. From FIG. 17B, it is apparent that the Di-AC embedded specimen has a notable increment in intensity, compared to the control sample. This result further advances a hypothesis that the intensity increase is due to the mechanophore activation within the matrix.

D. Early Damage Detection in Carbon Fiber Reinforced Polymer Composites

1. Quasi-Static Loading Tests

Figure 19:
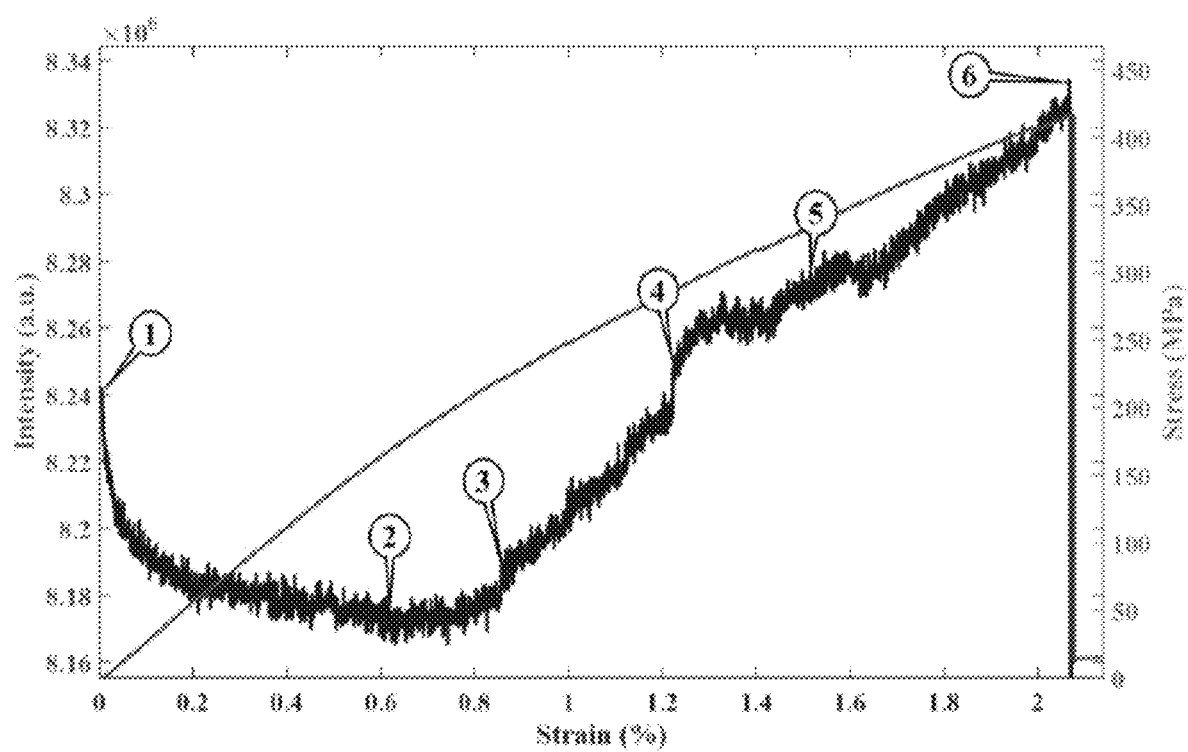
FIG. 19 shows stress-strain curve vs. fluorescence intensity data of a Di-AC embedded three-ply CFRP composite specimen.

The effectiveness of mechanophores to detect an early damage state in carbon fiber laminates was investigated. Three-ply carbon fiber composite specimens with 5 wt % Di-AC were fabricated and tested under quasi-static loading conditions in the same manner of GFRP tests. The test was performed on notched specimens and the associated fluorescence was recorded in real time. A linear trend between intensity and strain was observed between 0.8% to 2.05% strain as shown in FIG. 19.

Figure 20A:
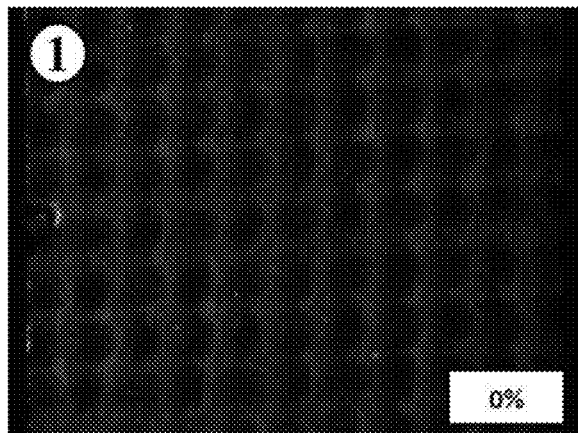
FIG. 20A-FIG. 20F show UV images of a Di-AC embedded three-ply CFRP composite specimen.
Figure 20B:
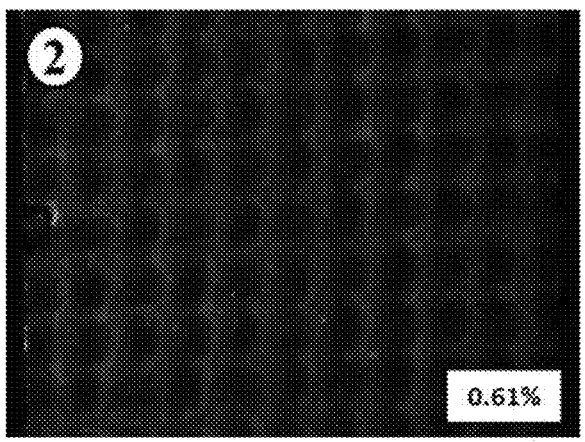
Figure 20C:
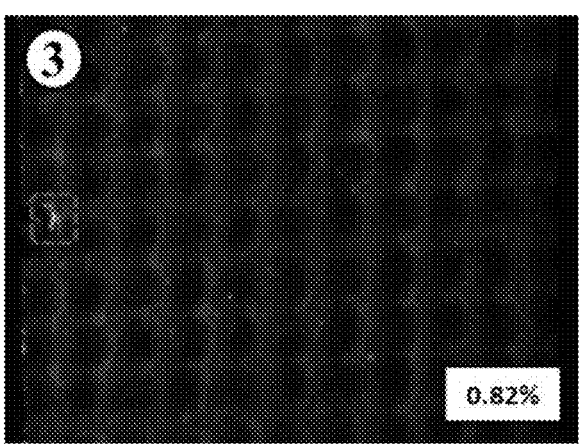
Figure 20D:
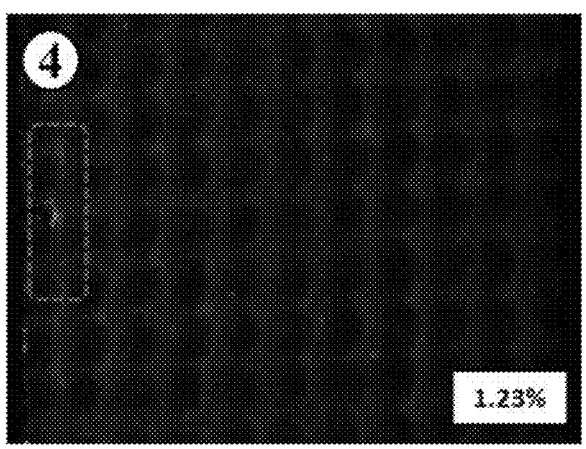
Figure 20E:
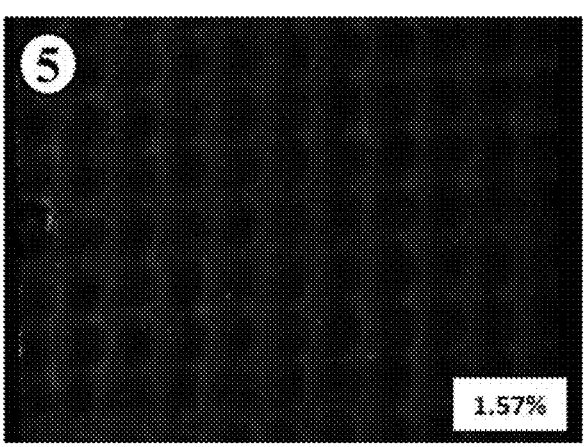
Figure 20F:
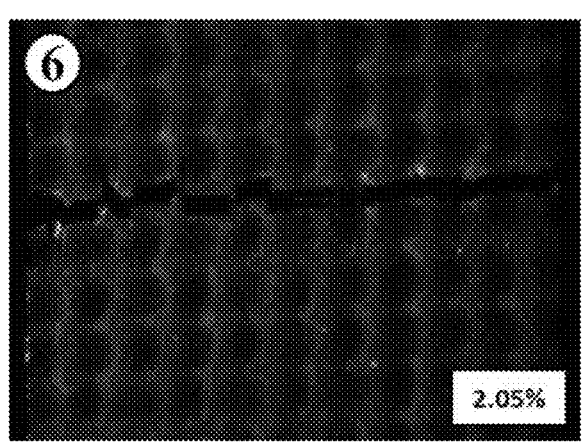

FIG. 20A-FIG. 20F show optical images of the CFRP composite specimen taken during various loading stages. FIG. 20A shows the sample at the beginning of the test and the lowest intensity of fluorescence was measured at around 0.61% strain (FIG. 20B); this is referred to as the baseline fluorescence image. This decrease in intensity could be attributed to several reasons such as UV absorption into the carbon fiber and manufacturing variation. Additionally, a self-healing effect—activated mechanophores due to the notch dimerized (healed) by UV lamp—can cause a decrease in signal intensity. Significant difference in intensity between the baseline image and the images obtained at higher loading can be seen in FIG. 20C-FIG. 20F. At 0.82% strain, a slight increase in intensity around the notch area was observed as shown in FIG. 20D. As loading increased, the damage around the notched area increased, resulting in an increased intensity. FIG. 20E shows that intensity of the field of view increased globally. Complete failure of the sample occurred at 2.05% strain as shown in FIG. 20F. Unlike the results obtained from GFRP samples, microcrack formation which creates local intensity increments was barely observed from the UV images of the CFRP sample. Only the intensity variation around the notch was visible to the naked eye. However, the intensity curve in FIG. 19 indicated that the intensity measured from the UV camera increased linearly before yield. This implies that a UV camera with a high quantum efficiency can detect small amounts of mechanophore activation which are hardly distinguishable with the naked eye. These results illustrate not only the potential of using mechanophore for early damage detection in multiple-ply CFRP samples, but also the importance of using a UV camera with a high quantum efficiency.

2. CFRP with Delamination Under Quasi-Static Loading

Figure 21:
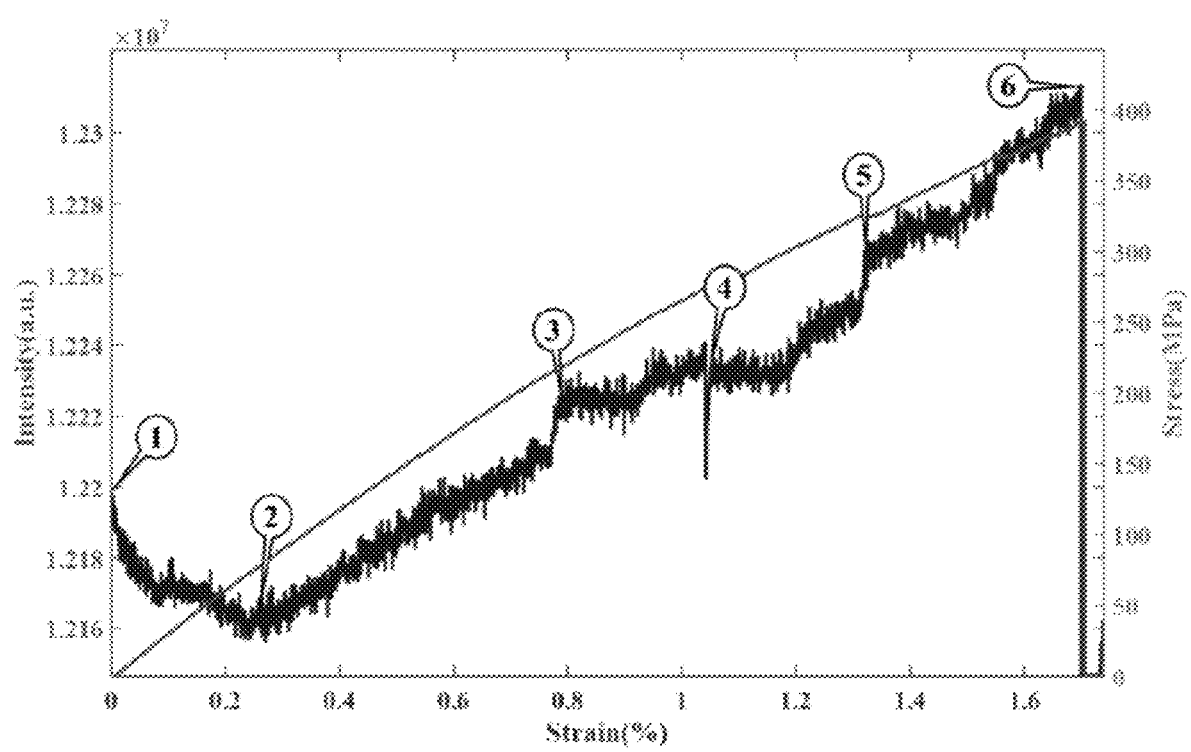
FIG. 21 shows experimental stress-strain curve vs. fluorescence intensity data of a Di-AC embedded three-ply CFRP composites with induced delamination.

The optical response of mechanophores in multiple-ply composites with delamination was characterized to study the effects of in situ damage in CFRP composite specimens. Three-ply carbon fiber composite samples with 5 wt % Di-AC (embedded in the polymer matrix) were fabricated with Teflon inserts. An approximately linear trend between intensity and strain was observed between 0.28% to 1.71% strain as shown in FIG. 21.

Figure 22A:
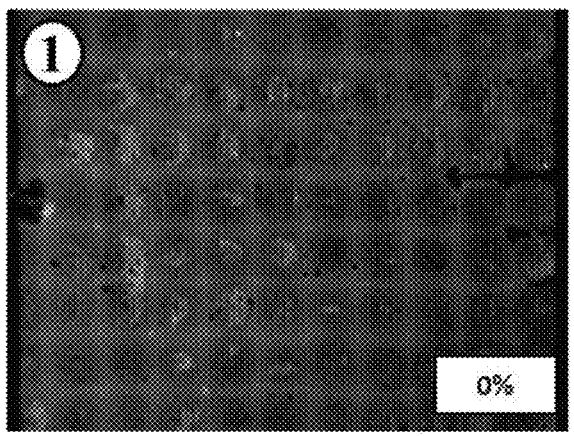
FIG. 22A-FIG. 22F show UV images of Di-AC embedded three-ply CFRP composites with delamination.
Figure 22B:
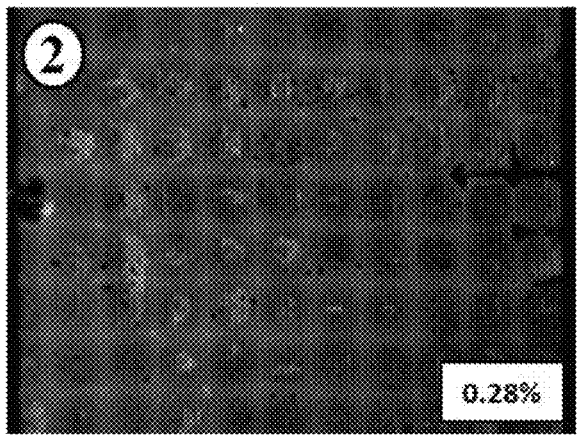
Figure 22C:
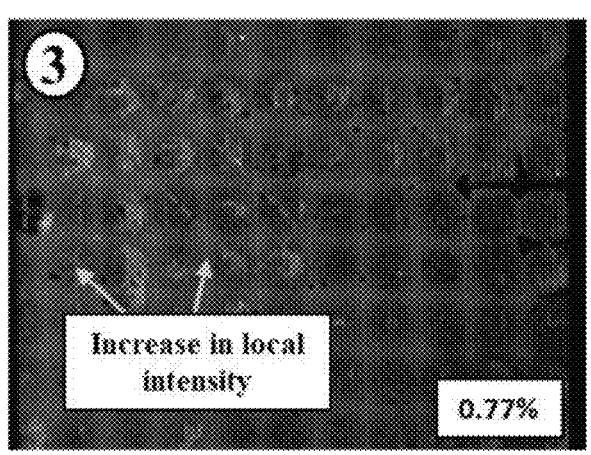
Figure 22D:
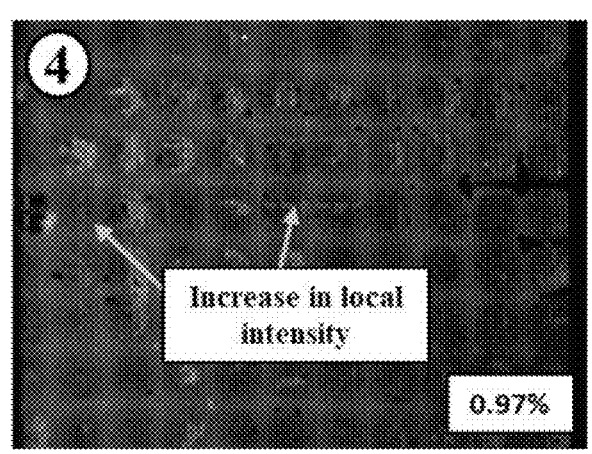
Figure 22E:
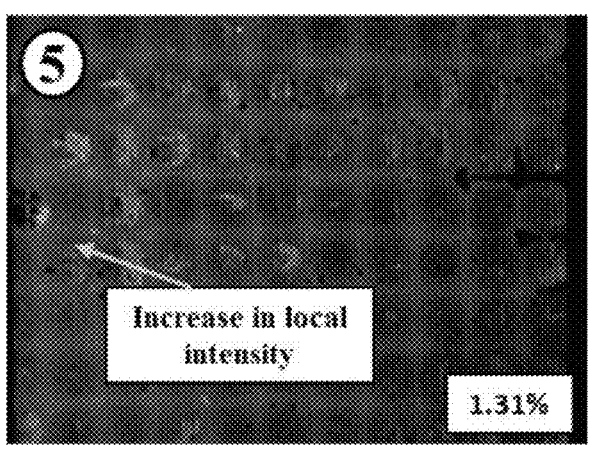
Figure 22F:
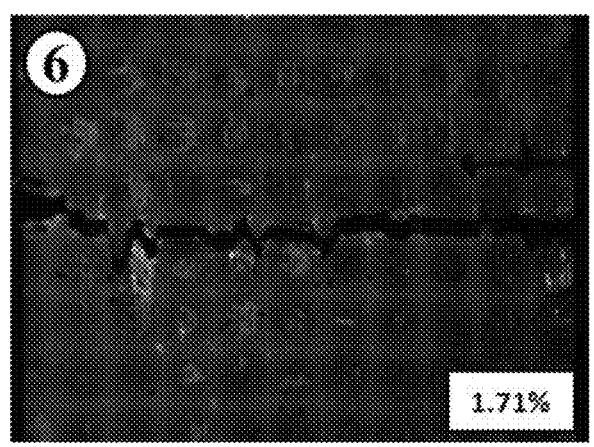

FIG. 22A-FIG. 22F show optical images of the GFRP composite specimen taken during various loading stages. FIG. 22A shows the sample at the beginning of the test and the lowest intensity of fluorescence was measured at 0.28% strain (FIG. 22B); this is referred to as the baseline fluorescence image. This decrease in intensity is also attributed to partial mechanophore activation due to the notch, causing these activated mechanophores to be dimerized by the UV lamp. Significant difference in intensity between the baseline image and those obtained at higher loading can be seen in FIG. 22C-FIG. 22F. At 0.77% strain, intensity in the region of the induced delamination increased significantly as shown in FIG. 22C. Specially the areas designated by red boxes exhibited significant increase in intensity. With increase in loading, global intensity increased and intensity of some local areas near the edges of the induced delamination and the notch increased as well (FIG. 22D). At 1.31% strain, there was a significant increase in intensity as shown in FIG. 22E. Complete failure of the sample occurred at 1.71% strain as shown in FIG. 22F. These results indicate that Di-AC mechanophore could be also used to detect in situ interlaminar damage in CFRP composite specimens.

E. Comparison of Fluorescence Response in GFRP and CFRP

Figure 23:
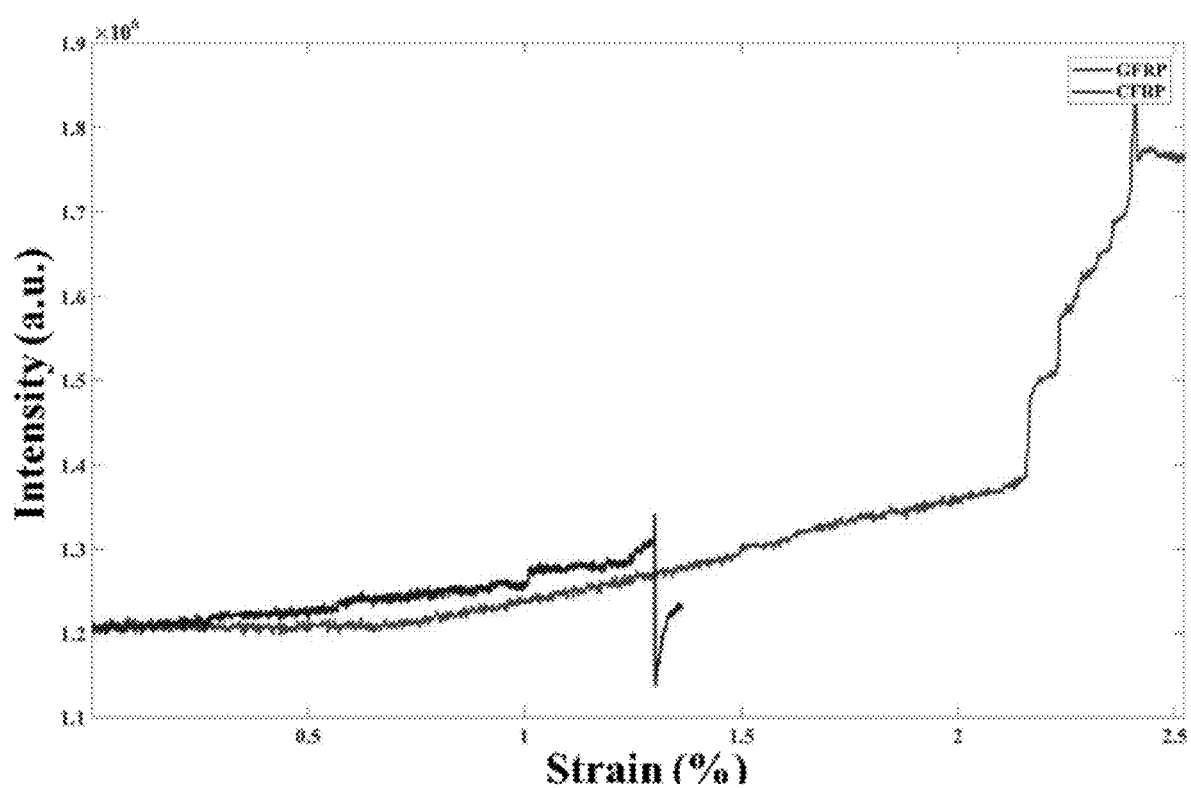
FIG. 23 shows experimental intensity increment comparison between Di-AC embedded GFRP and Di-AC embedded CFRP.

A comparative study between Di-AC embedded GFRP and Di-AC embedded CFRP was conducted to investigate the influence of the fiber material. Rescaled intensity curves are presented in FIG. 23. The slopes of the two curves showed similar trends, although the strains where the intensity increment starts are different (FIG. 23). This relatively less influence of the fiber material on the intensity increase may be due to the fact that mechanophore activation is primarily a matrix driven phenomenon. The CFRP sample had a lower yield strength due to increased brittleness. These results exhibit the feasibility of mechanophore for self-sensing and early damage detection in CFRP composite specimens.

What is claimed is:

1. A composite material comprising:
   a matrix material;
   a fiber dispersed in the matrix material; and
   an ultraviolet (UV)-light sensitive mechanophore grafted to a surface of the fiber.

2. The composite material according to claim 1, wherein the UV-light sensitive mechanophore includes a cinnamoyl group.

3. The composite material according to claim 1, wherein the UV-light sensitive mechanophore includes a silane group.

4. The composite material according to claim 1, wherein the UV-light sensitive mechanophore is derived from a reaction including 3-aminopropyl triethoxysilane.

5. The composite material according to claim 1, wherein the UV-light sensitive mechanophore includes dimeric anthracene (Di-AC).

6. The composite material according to claim 1, wherein the UV-light sensitive mechanophore is capable of a fluorescent response when the composite material has interlaminar damage.

7. The composite material according to claim 1, wherein the fiber is a glass fiber or a carbon fiber.

8. The composite material according to claim 1, wherein the matrix material includes a thermoset polymer.

9. The composite material according to claim 1, wherein the matrix material includes an epoxy resin and a hardener.

10. The composite material according to claim 1, wherein the UV-light sensitive mechanophore is directly grafted to the surface of the fiber through attachment of a pendant amine group to the surface of the fiber.

11. The composite material according to claim 1, wherein the UV-light sensitive mechanophore is not embedded in the matrix material.

* * * * *